(12) United States Patent
Nishikata et al.

(10) Patent No.: US 11,126,122 B1
(45) Date of Patent: Sep. 21, 2021

(54) IMAGE FORMING APPARATUS AND NON-TRANSITORY COMPUTER READABLE MEDIUM

(71) Applicant: FUJIFILM Business Innovation Corp., Tokyo (JP)

(72) Inventors: Takumi Nishikata, Kanagawa (JP); Kazunobu Uchiyama, Kanagawa (JP); Eiichi Waida, Kanagawa (JP); Yusuke Chika, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/114,328

(22) Filed: Dec. 7, 2020

(30) Foreign Application Priority Data

May 27, 2020 (JP) .............................. JP2020-092734

(51) Int. Cl.
*G03G 15/00* (2006.01)
(52) U.S. Cl.
CPC ......... *G03G 15/50* (2013.01); *G03G 15/6529* (2013.01)
(58) Field of Classification Search
CPC ............... G03G 15/50; G03G 15/5012; G03G 15/5075; G03G 15/5083; G03G 15/5087;
(Continued)

(56) References Cited

U.S. PATENT DOCUMENTS

| 10,082,986 B2 | 9/2018 | Wang | |
|---|---|---|---|
| 2012/0081715 A1* | 4/2012 | Takano | G03G 15/5062 358/1.5 |

(Continued)

FOREIGN PATENT DOCUMENTS

| JP | 2018051857 | 4/2018 |
|---|---|---|
| JP | 2018205652 | 12/2018 |

*Primary Examiner* — Thomas S Giampaolo, II
(74) *Attorney, Agent, or Firm* — JCIPRNET

(57) ABSTRACT

An image forming apparatus includes a first processor and a second processor. The first processor controls a transporter that transports a sheet and a first image forming section that forms an image on the sheet transported by the transporter. The second processor controls a second image forming section that forms an image on the sheet transported by the transporter. When the first processor and the second processor receive a single image formation command from an external source, the first processor transmits a preparation command for performing image formation preparation in the second image forming section to the second processor, the second processor, when receiving the preparation command, performs the image formation preparation in the second image forming section and transmits a completion notification to the first processor upon completion of the image formation preparation, and the first processor, after receiving the completion notification, subsequently executes an image forming process including causing the transporter to transport the sheet and causing the first image forming section to form the image. If the first processor receives multiple image formation commands from the external source before transmitting the preparation command to the second processor, the first processor transmits multiple preparation commands corresponding to the multiple image formation commands to the second processor and executes the image forming process in a sequence in which multiple completion notifications corresponding to the multiple preparation commands are received from the second processor.

8 Claims, 24 Drawing Sheets

(58) Field of Classification Search
CPC .......... G03G 2215/00016; G03G 2215/00021; G03G 2215/00113
See application file for complete search history.

(56) References Cited

U.S. PATENT DOCUMENTS

| | | | |
|---|---|---|---|
| 2015/0043929 A1* | 2/2015 | Yagi ................... | G03G 15/6585 399/38 |
| 2015/0063848 A1* | 3/2015 | Ikuta ..................... | B65H 5/062 399/45 |
| 2016/0202651 A1* | 7/2016 | Yamada ................ | G03G 15/50 399/382 |
| 2016/0378041 A1* | 12/2016 | Kidera ............... | G03G 15/6529 399/16 |

* cited by examiner

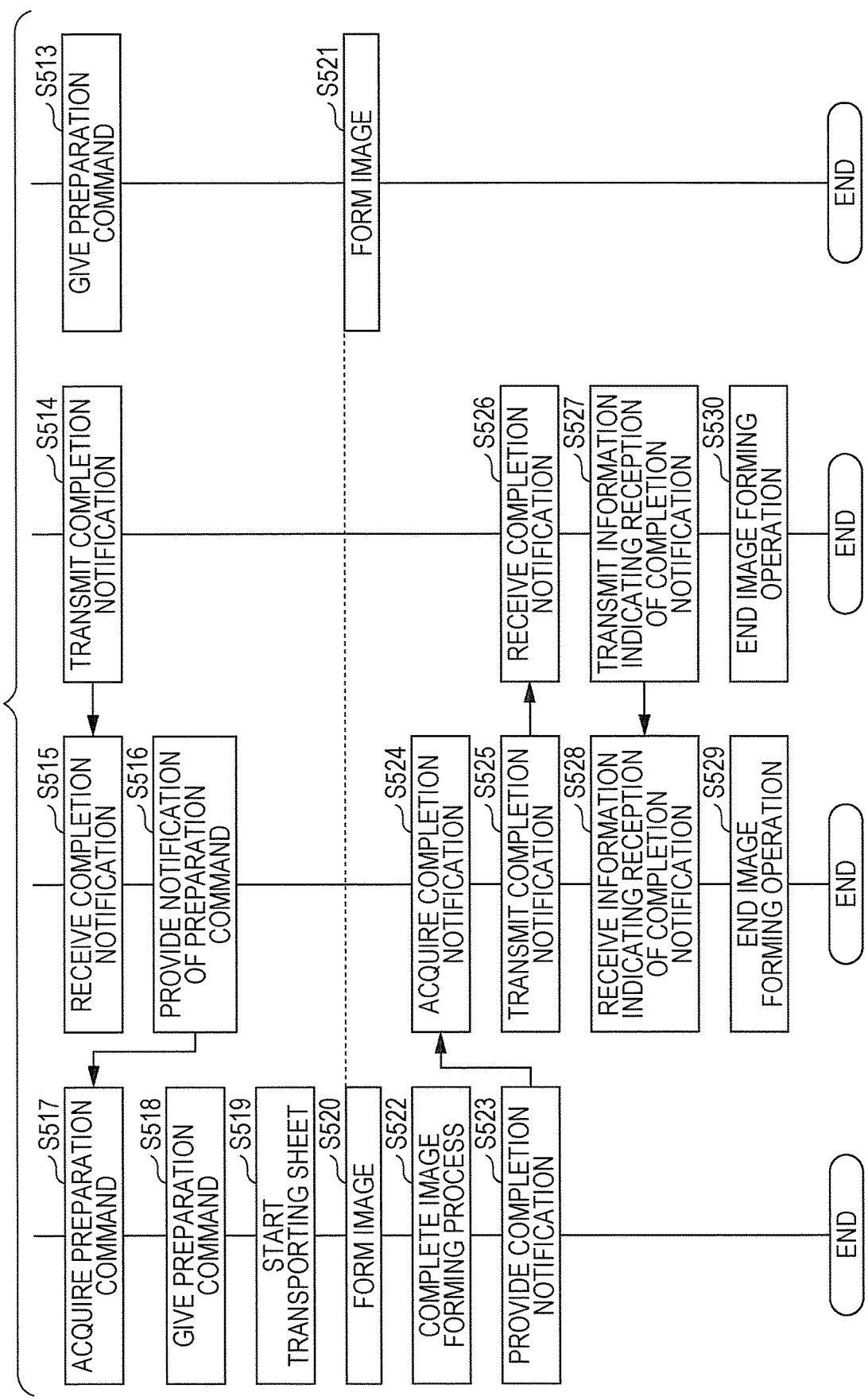

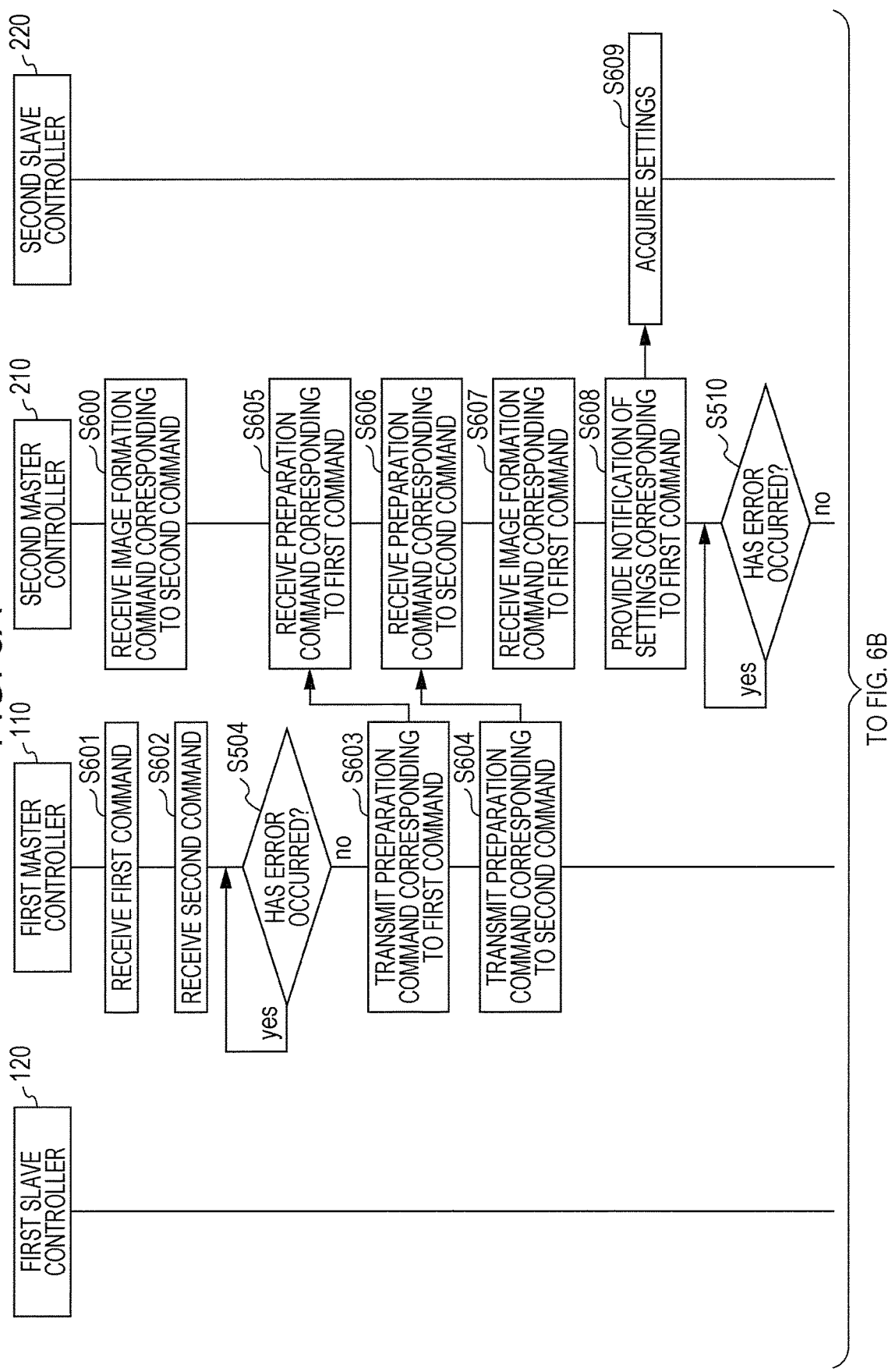

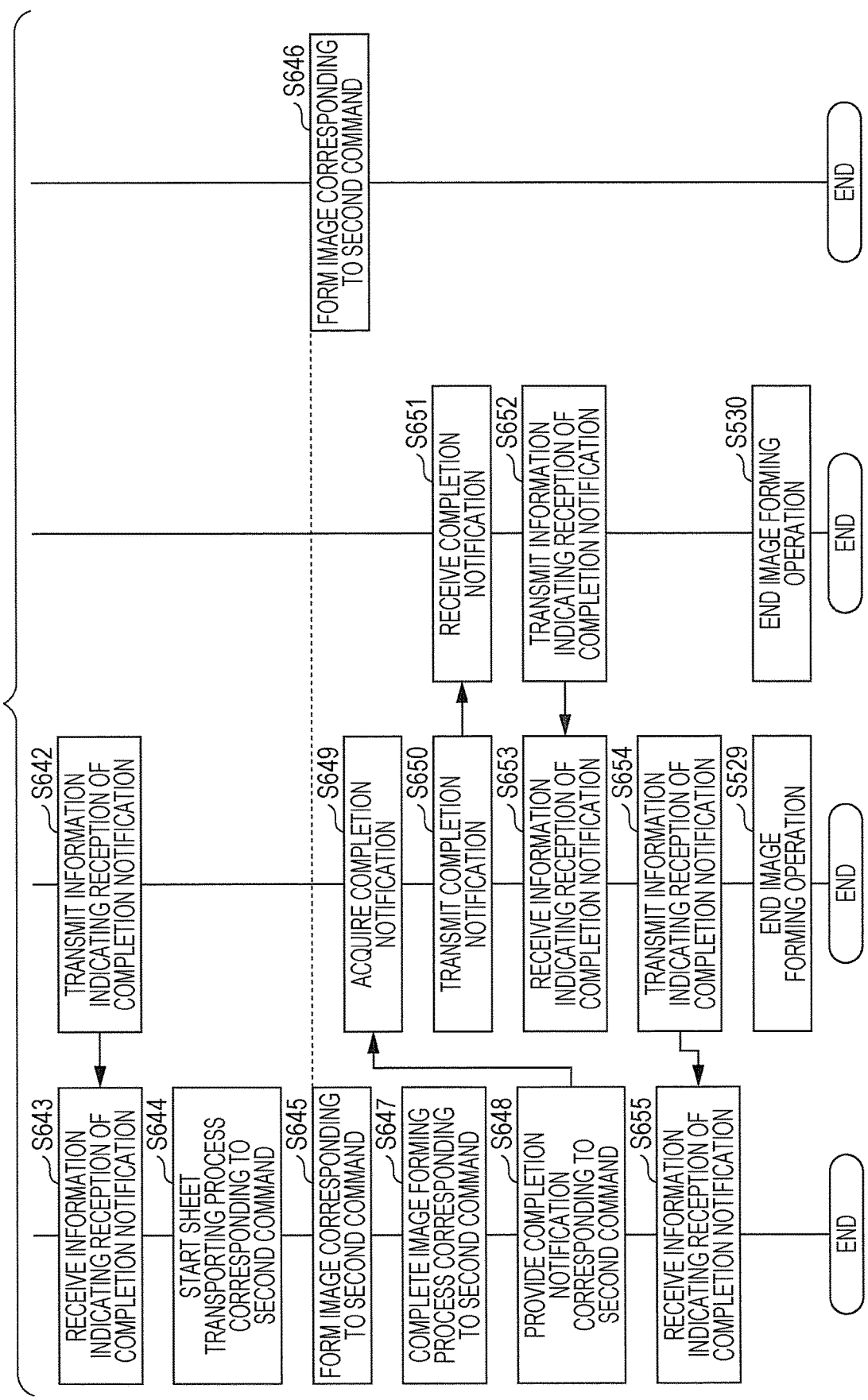

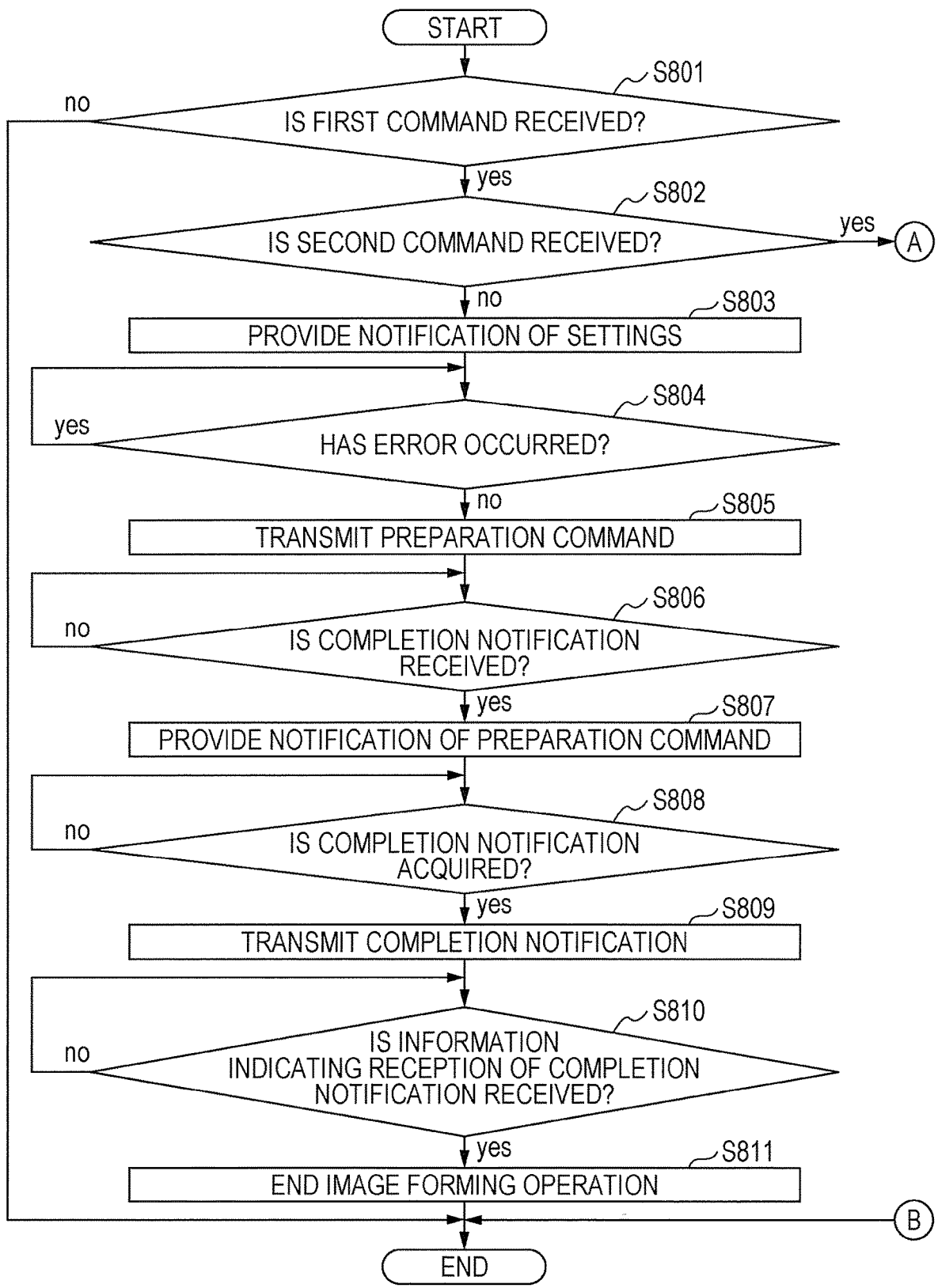

FROM FIG. 12A

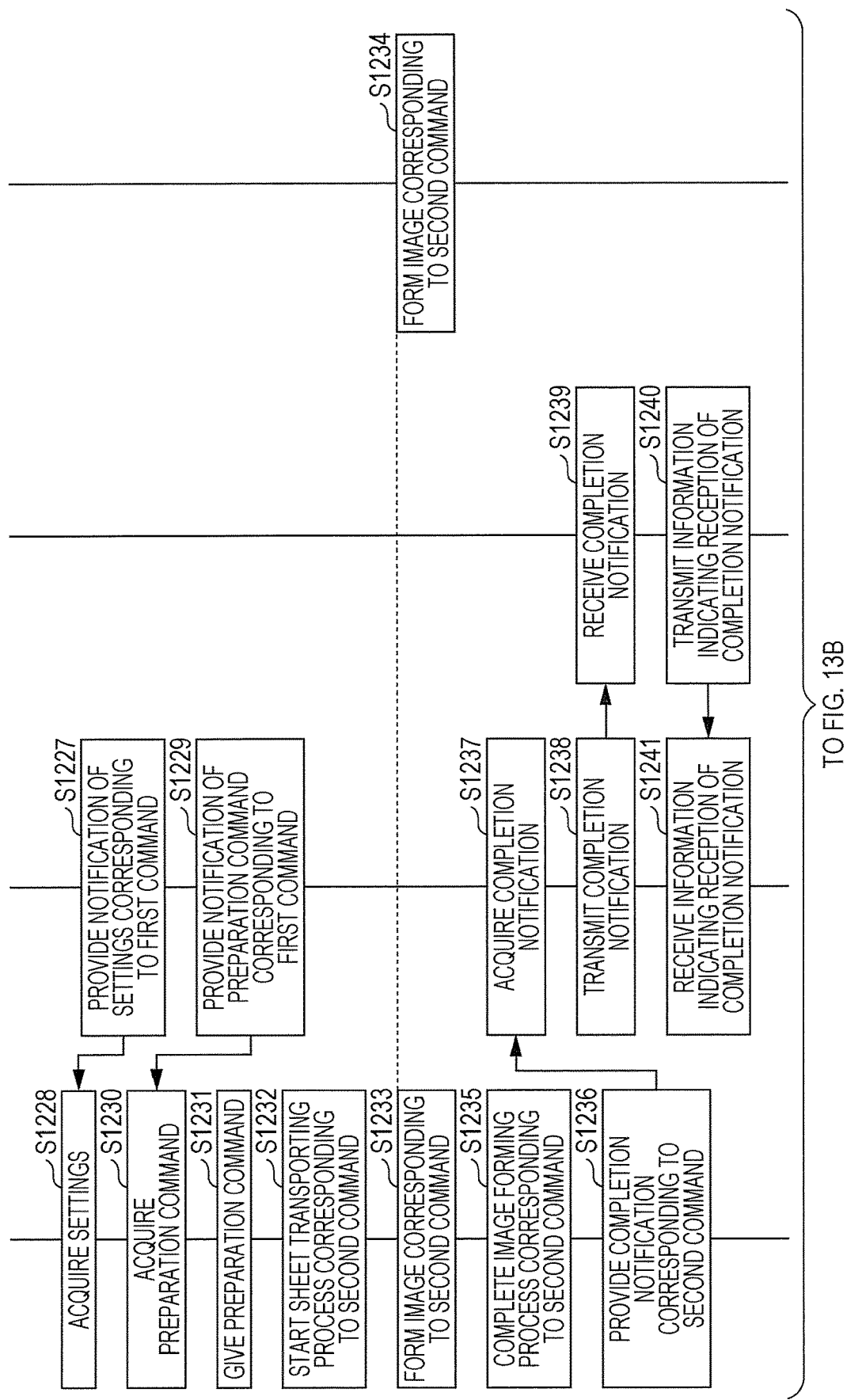

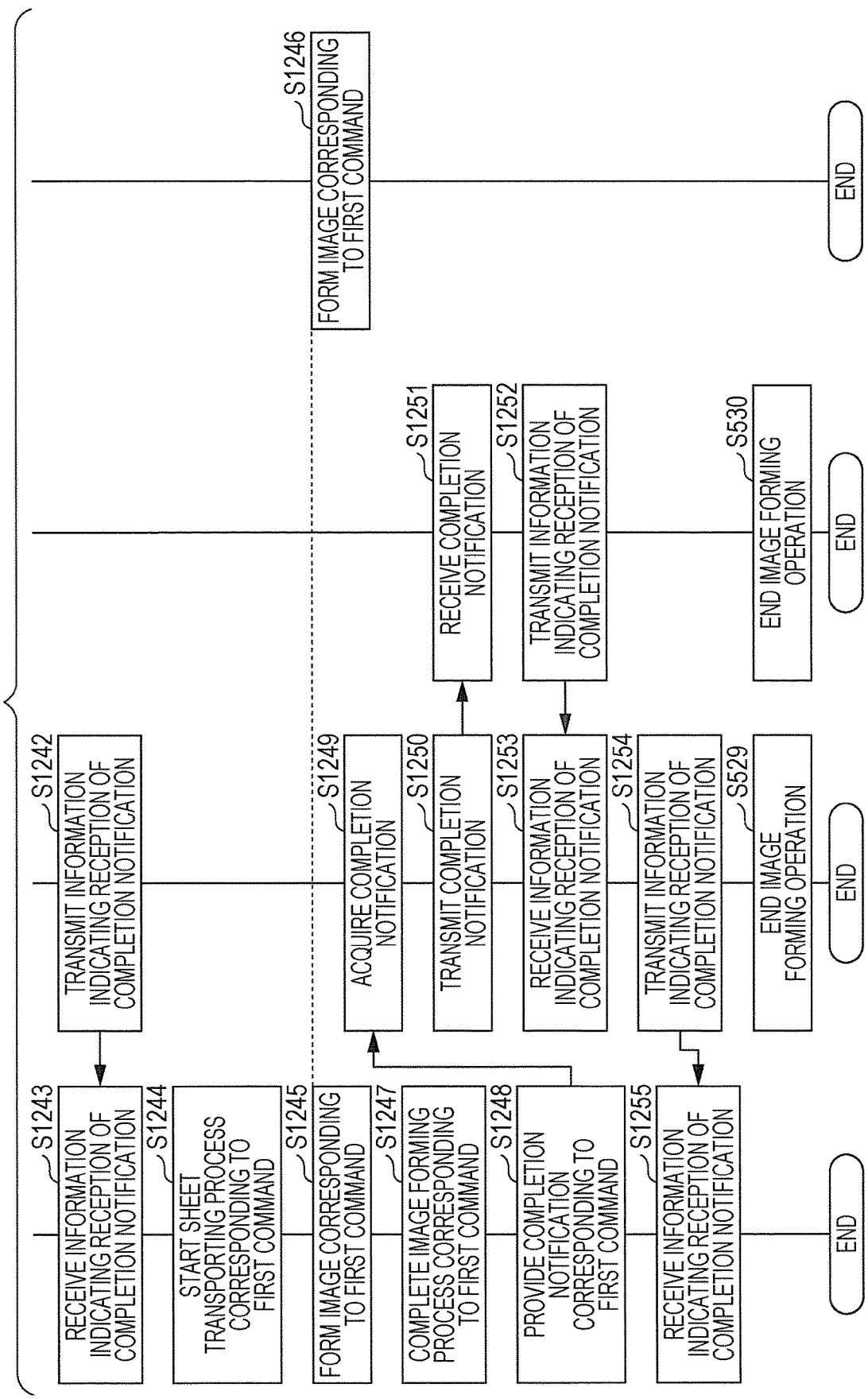

IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-092734 filed May 27, 2020.

BACKGROUND

(i) Technical Field

The present disclosure relates to image forming apparatuses and non-transitory computer readable media.

(ii) Related Art

In a technology proposed in the related art, two image forming sections form images on a single sheet.

For example, Japanese Unexamined Patent Application Publication No. 2018-205652 discloses an image forming system having the following configuration. Specifically, the image forming system includes a first image forming apparatus and a second image forming apparatus. The first image forming apparatus includes an image processing controller, a first controller, and an image forming section. The second image forming apparatus includes a second controller and an image forming section. When performing duplex printing, the image forming system feeds a sheet from a sheet feeder and causes the first image forming apparatus to perform printing on the front face of the sheet. Subsequently, the image forming system causes an inverting mechanism to invert the sheet, and transports the sheet to the second image forming apparatus. Then, the image forming system causes the second image forming apparatus to perform printing on the rear face of the sheet. After performing printing on the rear face of the sheet, the image forming system outputs the sheet to a paper output tray.

SUMMARY

For example, in a single image forming apparatus having a single housing, it is conceivable that the single housing contains therein two image forming sections that form images on a single sheet and two controllers that respectively control the two image forming sections, and that one of the controllers controls the transporting of the sheet. In such a configuration, when the two controllers individually receive multiple image formation commands from an external source, it is conceivable that the order in which the image formation commands are received may vary between one of the controllers and the other controller. Even in such a configuration, it is desirable that the two image forming sections execute image forming processes corresponding to the same image formation command on the single sheet instead of executing image forming processes corresponding to different image formation commands on the single sheet.

Aspects of non-limiting embodiments of the present disclosure relate to an image forming apparatus in which two image forming sections are capable of executing image forming processes corresponding to the same image formation command on a single sheet.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a first processor and a second processor. The first processor is configured to control a transporter that transports a sheet and a first image forming section that forms an image on the sheet transported by the transporter. The second processor is configured to control a second image forming section that forms an image on the sheet transported by the transporter. When the first processor and the second processor receive a single image formation command from an external source, the first processor is configured to transmit a preparation command for performing image formation preparation in the second image forming section to the second processor, the second processor, when receiving the preparation command, is configured to perform the image formation preparation in the second image forming section and transmit a completion notification to the first processor upon completion of the image formation preparation, and the first processor, after receiving the completion notification, is configured to subsequently execute an image forming process including causing the transporter to transport the sheet and causing the first image forming section to form the image. If the first processor receives multiple image formation commands from the external source before transmitting the preparation command to the second processor, the first processor is configured to transmit multiple preparation commands corresponding to the multiple image formation commands to the second processor and execute the image forming process in a sequence in which multiple completion notifications corresponding to the multiple preparation commands are received from the second processor.

BRIEF DESCRIPTION OF THE DRAWINGS

Exemplary embodiments of the present disclosure will be described in detail based on the following figures, wherein:

FIGS. 5A and 5B illustrate an example of a process performed by the first controller and the second controller;

FIGS. 6A and 6B illustrate an example of a process performed by the first controller and the second controller;

FIGS. 7A and 7B illustrate the example of the process performed by the first controller and the second controller;

FIG. 8 is a flowchart illustrating an example of a process performed by a first master controller;

FIGS. 13A and 13B illustrate the example of the process performed by the first controller and the second controller;

DETAILED DESCRIPTION

Exemplary embodiments of the disclosure will be described below with reference to the appended drawings.

First Exemplary Embodiment

Figure 1:
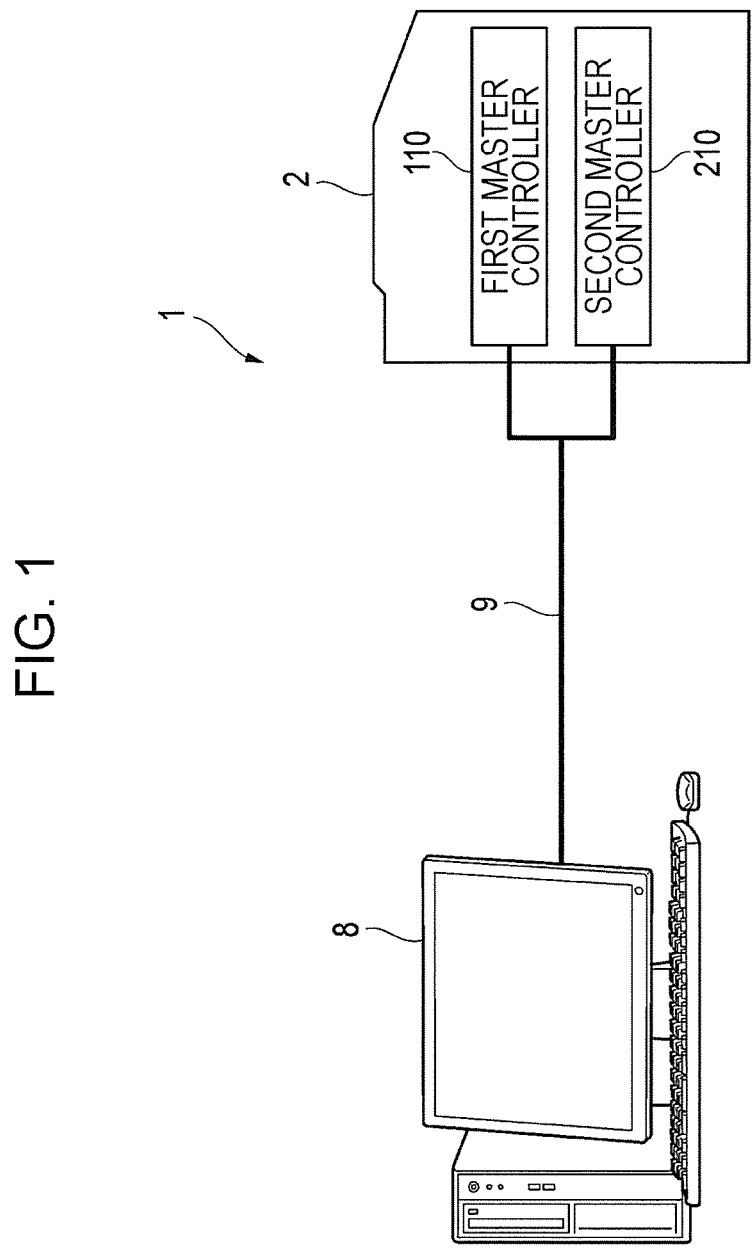
FIG. 1 schematically illustrates an example of an image forming system according to a first exemplary embodiment.

FIG. 1 schematically illustrates an example of an image forming system 1 according to a first exemplary embodiment.

Figure 2:
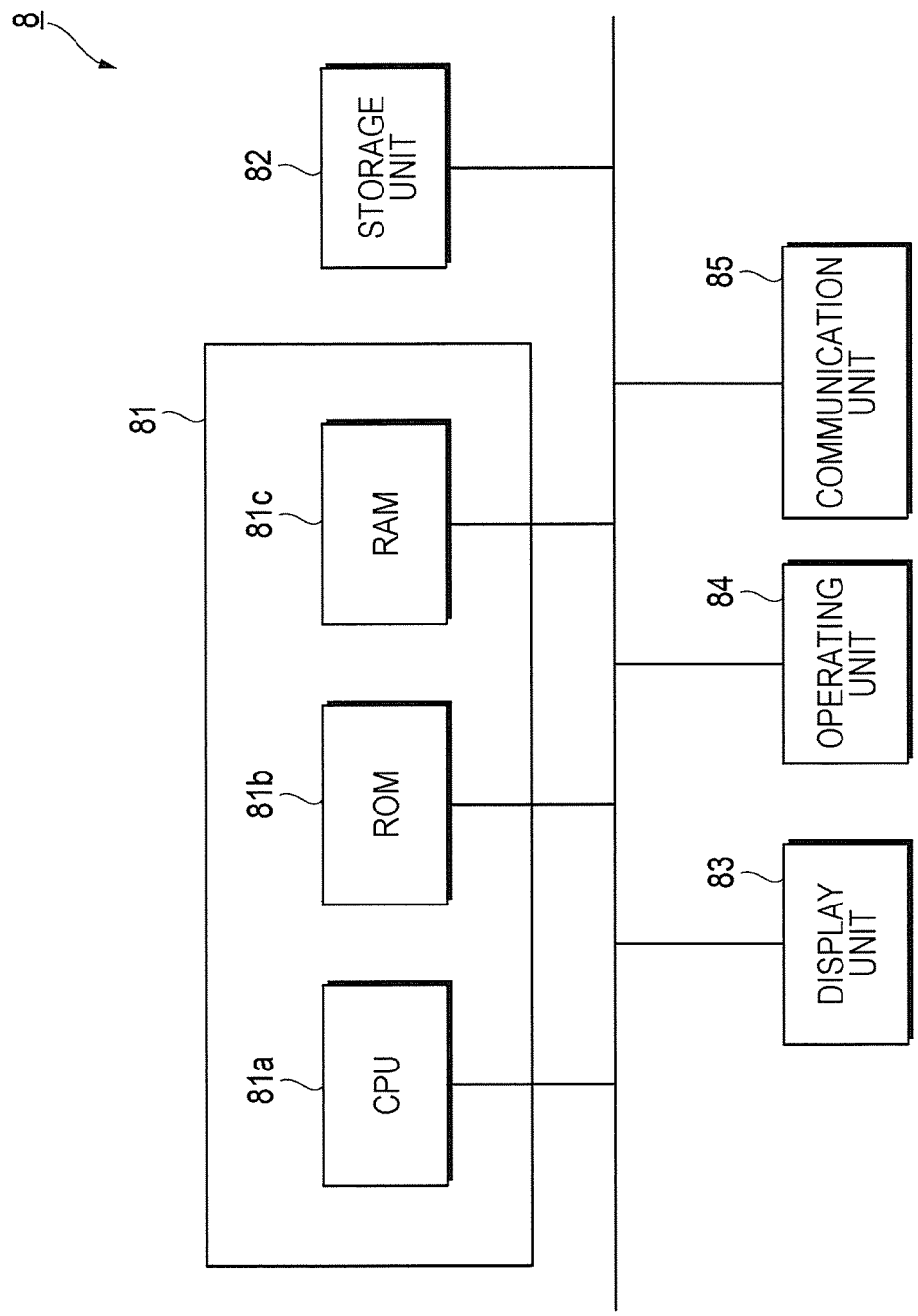
FIG. 2 illustrates an example of a hardware configuration of a terminal apparatus.

FIG. 2 illustrates an example of a hardware configuration of a terminal apparatus 8.

Figure 3:
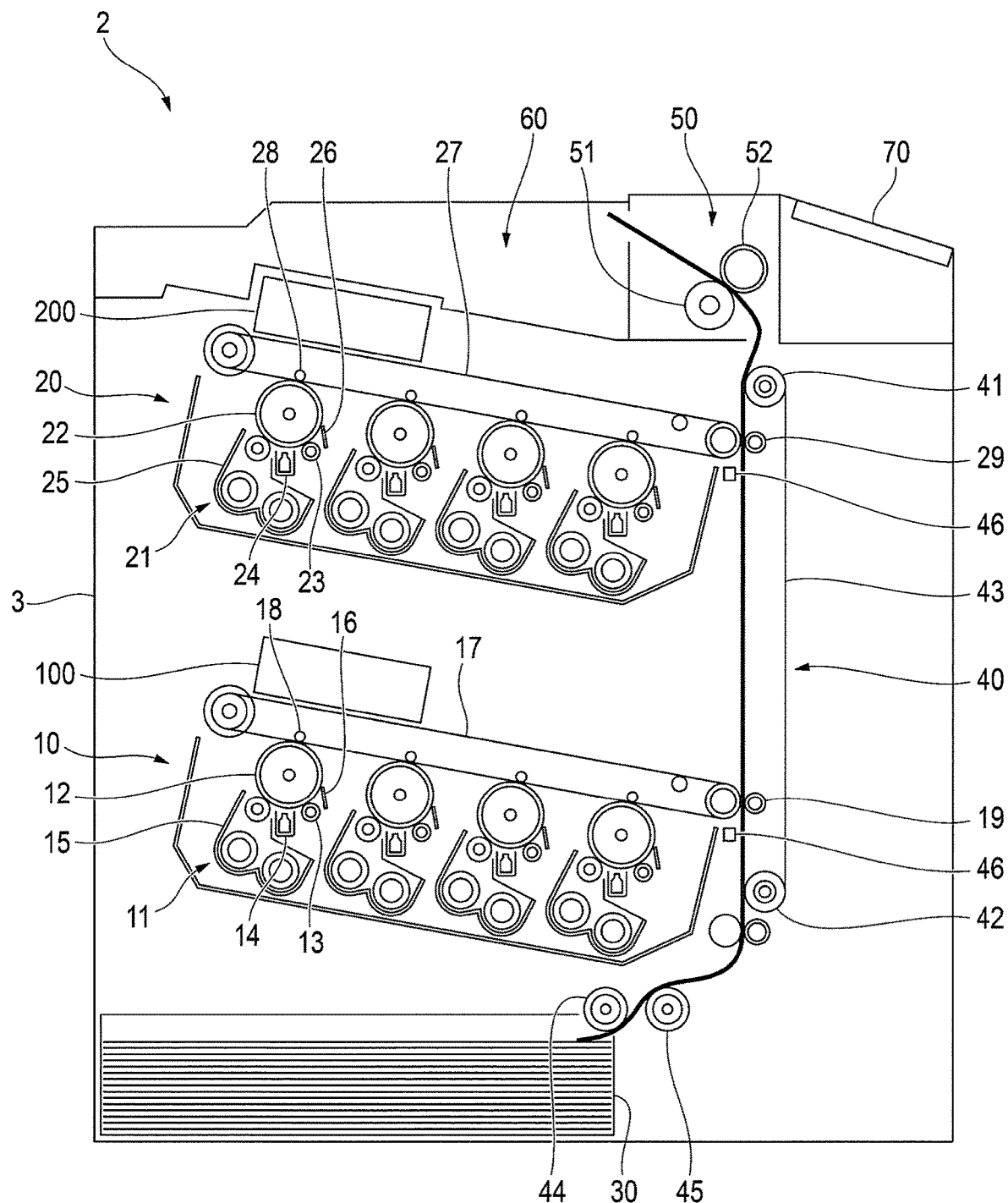
FIG. 3 schematically illustrates an example of an internal structure of an image forming apparatus.

FIG. 3 schematically illustrates an example of an internal structure of an image forming apparatus 2.

The image forming system 1 includes the image forming apparatus 2 and the terminal apparatus 8 connected to the image forming apparatus 2 by using a communication line 9. Although a single image forming apparatus 2 and a single terminal apparatus 8 are shown in FIG. 1, multiple image forming apparatuses 2 and multiple terminal apparatuses 8 may be provided.

The image forming apparatus 2 has a single housing 3 that contains therein a first image forming section 10 and a second image forming section 20 serving as two image forming sections that form images on a single sheet, a first controller 100 that controls the first image forming section 10, and a second controller 200 that controls the second image forming section 20. Furthermore, in the image forming apparatus 2, the first controller 100 controls a sheet transporter 40 that transports a sheet. The image forming apparatus 2 will be described in detail later.

Terminal Apparatus

The terminal apparatus 8 includes a controller 81 that controls the entire apparatus, a storage unit 82 used for storing data, a display unit 83 used for displaying an operation reception screen and an image, an operating unit 84 that receives an input operation from a user, and a communication unit 85 used for communicating with an external apparatus.

The controller 81 is constituted of a central processing unit (CPU) 81a, a read-only memory (ROM) 81b, and a random access memory (RAM) 81c. The ROM 81b stores therein a basic program (operating system) to be executed by the CPU 81a, as well as various settings. The CPU 81a uses the RAM 81c as a work area and executes, for example, application programs read from the ROM 81b and the storage unit 82. The CPU 81a executes the programs so as to control the components of the terminal apparatus 8.

An example of the storage unit 82 is a semiconductor memory. For example, the storage unit 82 stores therein an application program, such as a document creation application, a printer driver, and a spooler. For example, the document creation application generates a command for forming a document image on a sheet. The printer driver acquires the image formation command output from the document creation application and converts the image formation command into a command in a format analyzable by the image forming apparatus 2. The spooler temporarily stores the converted command output from the printer driver, waits until the image forming apparatus 2 completes an image forming process, and outputs a subsequent command.

In more detail, for example, after acquiring the image formation command output from the document creation application, the printer driver converts the image formation command into a command in a format analyzable by the first controller 100 and a command in a format analyzable by the second controller 200 in view of the characteristics of the first image forming section 10 and the second image forming section 20. Furthermore, the spooler outputs the command for the first controller 100 to the first controller 100, and outputs the command for the second controller 200 to the second controller 200. In the following description, the converted command output from the spooler may sometimes be referred to as "image formation command".

The display unit 83 displays, for example, still images and moving images. Examples of the display unit 83 include a liquid crystal display and an electroluminescence (EL) display.

The operating unit 84 is an input device that receives an operation from a user. Examples of the operating unit 84 include a button, a switch, and a touchscreen.

An example of the communication unit 85 is a communication interface.

Examples of the terminal apparatus 8 having the above-described configuration include a notebook personal computer (PC), a desktop PC, a tablet PC, a tablet terminal, a multifunction portable telephone (i.e., so-called "smartphone"), a portable telephone (i.e., so-called "feature phone"), and a portable information terminal (i.e., personal digital assistant (PDA)).

Image Forming Apparatus

The image forming apparatus 2 includes the first image forming section 10 that forms an image on a sheet as an example of a recording medium, and also includes the second image forming section 20 that forms an image on the sheet. The image forming apparatus 2 also includes a sheet retainer 30 that retains sheets and the sheet transporter 40 that transports each sheet retained in the sheet retainer 30 to, for example, the first image forming section 10. Moreover, the image forming apparatus 2 includes a fixing device 50 that applies heat and pressure onto a toner image formed on the sheet so as to fix the toner image onto the sheet, a sheet load section 60 on which the sheet having the image formed thereon as a result of the toner image being fixed thereon at the fixing device 50 is loaded, and a user interface (sometimes referred to as "UI" hereinafter) 70 that displays information. Furthermore, the image forming apparatus 2 includes the first controller 100 that controls the first image forming section 10, the sheet transporter 40, and the fixing device 50, and also includes the second controller 200 that controls the second image forming section 20.

The first image forming section 10 includes four image forming units 11 that are arranged parallel to one another at fixed intervals and that form toner images in the colors of toners contained therein. Each image forming unit 11 includes a photoconductor drum 12 that retains a toner image, a charging device 13 that electrostatically charges the surface of the photoconductor drum 12, and a light-emitting-diode (LED) print head 14 that exposes the photoconductor drum 12 electrostatically charged by the charging device 13 to light based on corresponding-color image data so as to form an electrostatic latent image on the photoconductor drum 12. Each image forming unit 11 further includes a developing device 15 that develops the electrostatic latent image formed on the photoconductor drum 12 and a drum cleaner 16 that cleans the photoconductor drum 12 after a transfer process. In the four image forming units 11 according to this exemplary embodiment, the developing devices 15 contain yellow (Y), magenta (M), cyan (C), and black (K) toners, respectively, and form toner images of the respective colors.

Furthermore, the first image forming section 10 includes an intermediate transfer belt 17 onto which the toner images of the respective colors formed on the photoconductor drums 12 of the individual image forming units 11 are superposed and transferred. Moreover, the first image forming section 10 includes first transfer rollers 18 that sequentially transfer (first-transfer) the toner images of the respective colors formed at the individual image forming units 11 onto the intermediate transfer belt 17, and also includes a second transfer roller 19 that collectively transfers (second-transfers) the toner images superposed and transferred on the intermediate transfer belt 17 onto the sheet.

Similar to the first image forming section 10, the second image forming section 20 includes four image forming units 21, an intermediate transfer belt 27, first transfer rollers 28, and a second transfer roller 29. Similar to the image forming units 11, the image forming units 21 each include a photoconductor drum 22, a charging device 23, an LED print head 24, a developing device 25, and a drum cleaner 26. In the four image forming units 21 according to this exemplary embodiment, the developing devices 25 contain therein white, gold, silver, and clear toners, respectively, and form toner images of the respective colors. The colors of the toners contained in the developing devices 25 of the image forming units 21 are not limited to the aforementioned colors. For example, the colors may alternatively be red, blue, and green.

The sheet transporter 40 includes an upper roller 41 and a lower roller 42 disposed apart from each other in the vertical direction, and also includes a transport belt 43 wrapped around the upper roller 41 and the lower roller 42. Furthermore, the sheet transporter 40 includes a feed roller 44 that feeds each sheet retained in the sheet retainer 30 toward the transport belt 43, and also includes a transport roller 45 disposed between the feed roller 44 and the transport belt 43. The sheet transporter 40 also includes multiple sensors 46 that detect the passing of a transported sheet.

The fixing device 50 includes a heating roller 51 that heats a transported sheet, and also includes a belt module 52 that is pressed against the heating roller 51 and that forms a pressure unit together with the heating roller 51. The fixing device 50 applies heat and pressure, at the pressure unit, onto a sheet having a toner image, so as to fix the toner image onto the sheet.

The UI 70 is, for example, a display panel that receives information from a user and that displays information to the user.

The image forming apparatus 2 having the above-described configuration operates as follows.

The toner images of the four colors formed on the photoconductor drums 12 in the image forming units 11 of the first image forming section 10 are first-transferred onto the intermediate transfer belt 17 by the first-transfer rollers 18, so that a superposed toner image constituted of the superposed toners of the four colors is formed on the intermediate transfer belt 17. Then, as the intermediate transfer belt 17 moves, the superposed toner image on the intermediate transfer belt 17 is transported to a second-transfer unit where the second-transfer roller 19 is disposed.

When the superposed toner image in the first image forming section 10 is transported to the second-transfer unit, a sheet is fed from the sheet container 30 to the second-transfer unit in accordance with this timing. Then, at the second-transfer unit, the superposed toner image is collectively second-transferred onto the transported sheet in accordance with a transfer electric field produced by the second-transfer roller 19.

The toner images of the remaining four colors formed on the photoconductor drums 22 in the image forming units 21 of the second image forming section 20 are first-transferred onto the intermediate transfer belt 27 by the first-transfer rollers 28, so that a superposed toner image constituted of the superposed toners of the remaining four colors is formed on the intermediate transfer belt 27. Then, as the intermediate transfer belt 27 moves, the superposed toner image on the intermediate transfer belt 27 is transported to a second-transfer unit where the second-transfer roller 29 is disposed.

When the superposed toner image in the second image forming section 20 is transported to the second-transfer unit, the sheet having the superposed toner image electrostatically transferred thereon at the first image forming section 10 is fed to this second-transfer unit in accordance with this timing. Then, at the second-transfer unit, the superposed toner image in the second image forming section 20 is collectively second-transferred onto the superposed toner image on the transported sheet, having the superposed toner image electrostatically transferred thereon at the first image forming section 10, in accordance with a transfer electric field produced by the second-transfer roller 29.

Subsequently, the sheet having electrostatically transferred thereon a superposed toner image constituted of the superposed toner image in the first image forming section 10 and the superposed toner image in the second image forming section 20 is transported to the fixing device 50. The toner image on the sheet transported to the fixing device 50 receives heat and pressure applied by the fixing device 50, so as to be fixed onto the sheet. Then, the sheet having the fixed image thereon is transported to the sheet load section 60 of the image forming apparatus 2.

Figure 4:
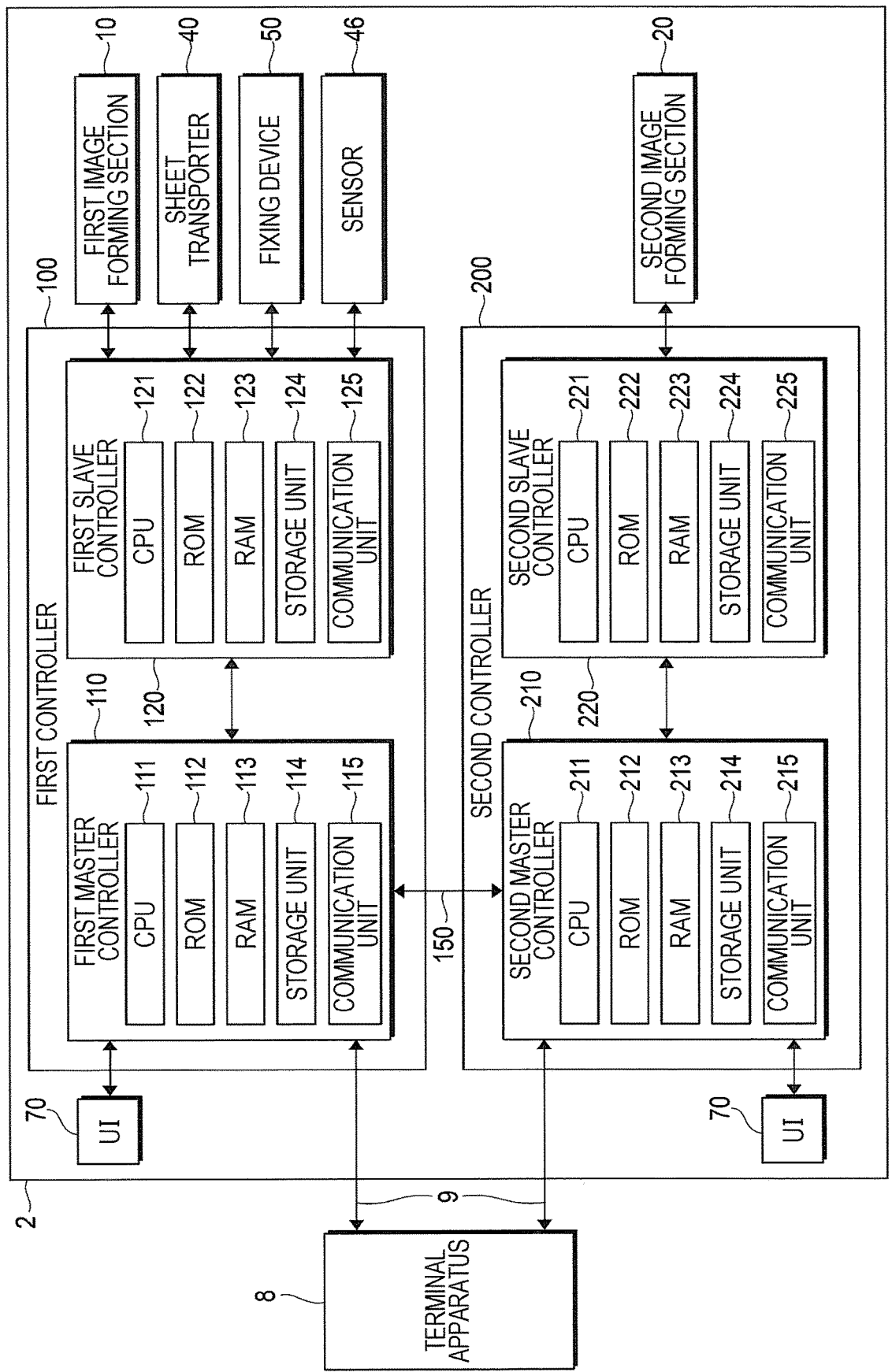
FIG. 4 is a block diagram illustrating an example of a hardware configuration of a first controller and a second controller.

FIG. 4 is a block diagram illustrating an example of a hardware configuration of the first controller 100 and the second controller 200.

First Controller 100

The first controller 100 includes a first master controller 110 that controls the operation of, for example, the first image forming section 10, the sheet transporter 40, and the fixing device 50, and also includes a first slave controller 120 that controls the operation of these devices under the control of the first master controller 110.

The first master controller 110 includes a central processing unit (CPU) 111, a read-only memory (ROM) 112, a random access memory (RAM) 113, a storage unit 114, such as a semiconductor memory, and a communication unit 115 used for communicating with an external apparatus. An example of the communication unit 115 is a communication interface (I/F).

The ROM 112 stores therein a basic program (operating system) to be executed by the CPU 111, as well as various settings. The CPU 111 uses the RAM 113 as a work area and executes programs read from the ROM 112 and the storage unit 114. The CPU 111 executes the programs so that functions of the first master controller 110 to be described below are realized.

The first master controller 110 exchanges information with the first slave controller 120, the second controller 200, and the UI 70 via the communication unit 115.

Furthermore, the first master controller 110 receives an image formation command from an external source, such as the terminal apparatus 8, via the communication unit 115. The first master controller 110 analyzes the received image formation command. The image formation command contains image data as data of an image to be formed, as well as designated image formation settings. Examples of the image formation settings include the size and the material of a sheet on which the image is to be formed, and the colors of colorants to be used.

The first master controller 110 also performs predetermined image processing on the received image data. The first master controller 110 converts the image data into YMCK data with respect to the reproduction colors of the first image forming section 10, that is, the colors (yellow (Y), magenta (M), cyan (C), and black (K)) of the toners serving as the colorants of the first image forming section 10, and outputs the YMCK data. The YMCK data is constituted of Y-color data, M-color data, C-color data, and K-color data that are separated from one another for the individual colors.

Furthermore, the first master controller 110 notifies the first slave controller 120 of the size and the material of the sheet according to the received image formation command.

Similar to the first master controller 110, the first slave controller 120 includes a CPU 121, a ROM 122, a RAM 123, a storage unit 124, and a communication unit 125. The CPU 121 uses the RAM 123 as a work area and executes programs read from the ROM 122 and the storage unit 124, so that functions of the first slave controller 120 to be described below are realized.

The first slave controller 120 exchanges control information with the first master controller 110 so as to perform control of, for example, exposure, development, and transfer processes in the first image forming section 10, sheet feed and transport processes by the sheet transporter 40 in accordance with a transfer timing, and a toner-image fixing process by the fixing device 50.

Furthermore, the first slave controller 120 acquires information about an error, such as a toner shortage in the first image forming section 10 or a paper jam in the sheet transporter 40. The first slave controller 120 notifies the first master controller 110 of this error information. The first master controller 110 notifies the user of this error information by displaying the error information on the display panel of the UI 70. Then, for example, if the error is a toner shortage, the first slave controller 120 acquires information indicating that the error has been resolved when the toner is resupplied. If the error is a paper jam, for example, the first slave controller 120 acquires information indicating that the error has been resolved when the paper jam is removed. Then, the first slave controller 120 notifies the first master controller 110 that the error has been resolved. The first master controller 110 notifies the user that the error has been resolved by displaying a message on the display panel of the UI 70.

Second Controller 200

The second controller 200 includes a second master controller 210 that controls the operation of the second image forming section 20, and also includes a second slave controller 220 that controls the operation of the second image forming section 20 under the control of the second master controller 210. The second master controller 210 exchanges information with the first master controller 110 via a connection line 150.

The second master controller 210 includes a CPU 211, a ROM 212, a RAM 213, a storage unit 214, such as a semiconductor memory, and a communication unit 215 used for communicating with an external apparatus.

The ROM 212 stores therein a basic program (operating system) to be executed by the CPU 211, as well as various settings. The CPU 211 uses the RAM 213 as a work area and executes programs read from the ROM 212 and the storage unit 214. The CPU 211 executes the programs so that functions of the second master controller 210 to be described below are realized.

The second master controller 210 exchanges information with the second slave controller 220, the first controller 100, and the UI 70 via the communication unit 215.

Furthermore, the second master controller 210 receives an image formation command from, for example, a user terminal (such as a PC) via the communication unit 215. The second master controller 210 analyzes the received image formation command. The image formation command contains image data as data of an image to be formed, as well as designated image formation settings.

The second master controller 210 also performs predetermined image processing on the received image data. The second master controller 210 converts the image data into white-color data, gold-color data, silver-color data, and clear data with respect to the reproduction colors of the second image forming section 20, that is, the colors (white, gold, silver, and clear) of the toners serving as the colorants of the second image forming section 20, and outputs the white-color data, the gold-color data, the silver-color data, and the clear data.

Moreover, the second master controller 210 notifies the second slave controller 220 of the size and the material of the sheet according to the received image formation command.

The second slave controller 220 includes a CPU 221, a ROM 222, a RAM 223, a storage unit 224, and a communication unit 225. The CPU 221 uses the RAM 223 as a work area and executes programs read from the ROM 222 and the storage unit 224, so that functions of the second slave controller 220 to be described below are realized.

The second slave controller 220 exchanges control information with the second master controller 210 so as to perform control of, for example, exposure, development, and transfer processes in the second image forming section 20.

Furthermore, the second slave controller 220 acquires information about an error, such as a toner shortage in the second image forming section 20. The second slave controller 220 notifies the second master controller 210 of this error information. The second master controller 210 notifies the user of this error information by displaying the error information on the display panel of the UI 70. Then, for example, if the error is a toner shortage, the second slave controller 220 acquires information indicating that the error has been resolved when the toner is resupplied. Then, the second slave controller 220 notifies the second master controller 210 that the error has been resolved. The second master controller 210 notifies the user that the error has been resolved by displaying a message on the display panel of the UI 70.

Collaborative Operation Between First Controller 100 and Second Controller 200

The first controller 100 and the second controller 200 exchange information with each other after activation, cause the first image forming section 10 to second-transfer the four-color superposed toner image onto a sheet transported by the sheet transporter 40 operating under the control of the first controller 100, and cause the second image forming section 20 to second-transfer the other four-color superposed toner image onto the sheet. The expression "the first image forming section 10 second-transfers the four-color superposed toner image onto the sheet" may sometimes be expressed as "the first image forming section 10 forms an image" hereinafter. The expression "the second image forming section 20 second-transfers the other four-color superposed toner image onto the sheet" may sometimes be expressed as "the second image forming section 20 forms an image" hereinafter.

The process performed by the first controller 100 and the second controller 200 will be described below.

For example, after acquiring an image formation command output from the document creation application, if the command is given for forming images at the first image forming section 10 and the second image forming section 20, the printer driver in the terminal apparatus 8 converts the command into a command for the first master controller 110 and the second master controller 210. Then, the spooler outputs the command to each of the first master controller 110 and the second master controller 210. In this manner, the terminal apparatus 8 transmits an image formation command to each of the first master controller 110 and the second master controller 210.

Figure 5A:
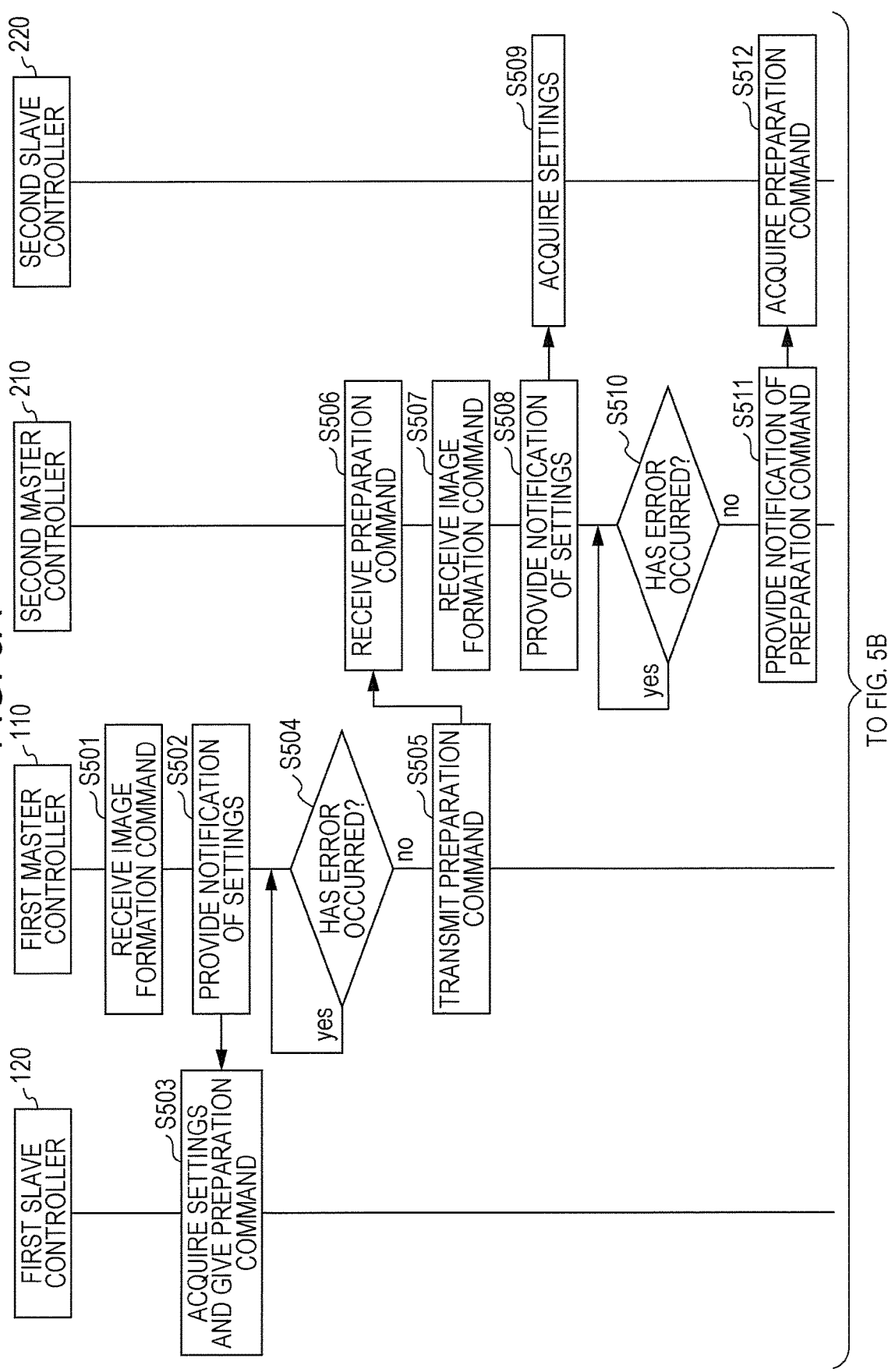

FIGS. 5A and 5B illustrate an example of the process performed by the first controller 100 and the second controller 200.

When the first master controller 110 receives an image formation command from, for example, the terminal apparatus 8 via the communication unit 115 in step S501, the first master controller 110 notifies the first slave controller 120 of designated image formation settings in step S502. Consequently, in step S503, the first slave controller 120 acquires the image formation settings and gives a command for image formation preparation. Image formation preparation involves, for example, preparing the sheet transporter 40 to make it capable of transporting a sheet (sometimes referred to as "transport preparation" hereinafter), and includes activation of a motor that rotates various types of rollers, such as the feed roller 44. Another example of image formation preparation involves preparing the fixing device 50 to make it fix a toner image onto a sheet, and includes increasing the temperature of the heating roller 51.

Subsequently, the first master controller 110 determines in step S504 whether or not an error, such as a toner shortage or a paper jam, has occurred in the first image forming section 10. If an error has not occurred (NO in step S504), the first master controller 110 transmits, to the second master controller 210, a preparation command for performing image formation preparation in the second image forming section 20 in step S505. If an error has occurred (YES in step S504), the first master controller 110 waits until the error is resolved.

In step S506, the second master controller 210 receives the preparation command transmitted from the first master controller 110. Then, if the image formation command is received from, for example, the terminal apparatus 8 via the communication unit 215 in step S507, the second master controller 210 notifies the second slave controller 220 of the image formation settings in step S508. Consequently, the second slave controller 220 acquires the image formation settings in step S509. Alternatively, the reception of the image formation command in step S507 may be performed prior to the reception of the preparation command from the first master controller 110 in step S506.

Subsequently, the second master controller 210 determines in step S510 whether or not an error, such as a toner shortage, has occurred in the second image forming section 20. If an error has not occurred (NO in step S510), the second master controller 210 notifies the second slave controller 220 of the preparation command for performing image formation preparation in the second image forming section 20 in step S511. After acquiring the preparation command in step S512, the second slave controller 220 commands the second image forming section 20 to perform image formation preparation in step S513. Image formation preparation involves performing preparation when the second image forming section 20 is to form an image, and includes, for example, a warm-up process of the developing devices 25, an image-quality adjustment process, and a process for spontaneously disposing deteriorated toners. All of these processes consume electric power and some may consume toner. When the image formation preparation is completed, the second image forming section 20 is set on standby. In contrast, if an error has occurred (YES in step S510), the second master controller 210 waits until the error is resolved.

When the image formation preparation in the second image forming section 20 is completed, the second master controller 210 transmits a completion notification indicating that the preparation is completed to the first master controller 110 in step S514. Alternatively, after the command for image formation preparation is given in step S513, the second master controller 210 may determine that the image formation preparation in the second image forming section 20 is completed when the second master controller 210 receives a notification indicating that the preparation is completed from the second image forming section 20. As another alternative, after the command for image formation preparation is given in step S513, the second master controller 210 may determine that the image formation preparation in the second image forming section 20 is completed when a predetermined period elapses.

After receiving the completion notification from the second master controller 210 in step S515, the first master controller 110 notifies the first slave controller 120 of the preparation command for performing image formation preparation in the first image forming section 10 in step S516. After acquiring the preparation command in step S517, the first slave controller 120 commands the first image forming section 10 to perform image formation preparation in step S518. Image formation preparation includes, for example, a warm-up process of the developing devices 15, an image-quality adjustment process, and a process for spontaneously disposing deteriorated toners. When the image formation preparation is completed, the first image forming section 10 is set on standby.

When the image formation preparation in the first image forming section 10 is completed, the first slave controller 120 causes the sheet transporter 40 to start transporting a sheet in step S519, and causes the first image forming section 10 to form an image on the transported sheet in step S520. Alternatively, after giving the command for image formation preparation in step S516, the first master controller 110 may determine that the image formation preparation in the first image forming section 10 is completed when the first master controller 110 receives a notification indicating that the preparation is completed from the first image forming section 10. As another alternative, after giving the command for image formation preparation in step S516, the first master controller 110 may determine that the image formation preparation in the first image forming section 10 is completed when a predetermined period elapses.

In step S521, the second slave controller 220 causes the second image forming section 20 to form an image on the transported sheet.

Then, the first slave controller 120 causes the fixing device 50 to fix the toner image on the transported sheet onto the sheet and to output the sheet having undergone the fixing process onto the sheet load section 60, and completes the image forming process in step S522.

In step S523, the first slave controller 120 notifies the first master controller 110 that the image forming process is completed. After acquiring the completion notification in step S524, the first master controller 110 transmits the completion notification indicating that the image forming process is completed to the second master controller 210 in step S525.

After receiving the completion notification in step S526, the second master controller 210 transmits information indicating the reception of the completion notification to the first master controller 110 in step S527.

After receiving the information indicating the reception of the completion notification in step S528, the first master controller 110 ends the image forming operation in step S529. The end of the image forming operation includes an end of the toner-image forming process in the first image forming section 10 and a process for deleting current-image-formation-related information stored in the RAM 113 and the storage unit 114.

After transmitting the information indicating the reception of the completion notification to the first master controller 110 in step S527, the second master controller 210 ends the image forming operation in step S530. The end of the image forming operation includes an end of the toner-image forming process in the second image forming section 20 and a process for deleting current-image-formation-related information stored in the RAM 213 and the storage unit 214.

Accordingly, in this exemplary embodiment, the image forming operation is performed by causing the first controller 100 and the second controller 200 to operate collaboratively with each other.

For example, if an error has not occurred in the first image forming section 10 or the sheet transporter 40, serving as a target to be controlled by the first master controller 110, the first master controller 110 transmits, to the second master controller 210 in step S505, a preparation command for performing image formation preparation in the second image forming section 20. After receiving this preparation command in step S506, the second master controller 210 notifies the second slave controller 220 of the preparation command for performing image formation preparation in the second image forming section 20 in step S511 if an error has not occurred in the second image forming section 20, serving as a target to be controlled by the second master controller 210. When the image formation preparation in the second image forming section 20 is completed, the second master controller 210 transmits a completion notification indicating that the preparation is completed to the first master controller 110 in step S514. After receiving the completion notification in step S515, the first master controller 110 notifies the first slave controller 120 of the preparation command for performing image formation preparation in the first image forming section 10 in step S516.

Accordingly, a time lag between the timing at which the first image forming section 10 starts to form an image and the timing at which the second image forming section 20 starts to form an image may be suppressed. This time lag may be caused when, for example, the first controller 100 and the second controller 200 operate independently of each other instead of collaboratively with each other. For example, a situation where an image forming process by the second image forming section 20 is not performed in time may be suppressed. Such a situation may occur when a sheet transport process is started by the sheet transporter 40 or an image forming process is started by the first image forming section 10 regardless of the fact that the image formation preparation in the second image forming section 20 is not completed.

Moreover, a situation where electric power is wastefully consumed due to the second image forming section 20 being on standby for a long period of time regardless of the fact that an error has occurred in the first image forming section 10 or the sheet transporter 40 may be suppressed. Furthermore, a situation where electric power is wastefully consumed due to the first image forming section 10 being on standby for a long period of time regardless of the fact that an error has occurred in the second image forming section 20 may be suppressed.

In this exemplary embodiment, when an image forming process is completed, the first master controller 110 transmits, to the second master controller 210 in step S525, a completion notification indicating that the image forming process is completed. Then, after receiving the completion notification in step S526, the second master controller 210 transmits information indicating the reception of the completion notification to the first master controller 110 in step S527.

Consequently, a situation where the second controller 200 is not able to ascertain that the fixing process by the fixing device 50 is completed and that the image forming process is completed due to the first controller 100 and the second controller 200 operating independently of each other may be suppressed.

The following description relates to a process performed when multiple image formation commands are received by the first master controller 110 and the second master controller 210.

As mentioned above, since an image formation command is transmitted to each of the first master controller 110 and the second master controller 210 from an external apparatus, such as the terminal apparatus 8, the order in which the first master controller 110 receives multiple image formation commands and the order in which the second master controller 210 receives the multiple image formation commands may conceivably be different from each other depending on, for example, the degree of congestion in the communication line 9. In view of such circumstances, in the image forming apparatus 2 according to this exemplary embodiment, the first master controller 110 and the second master controller 210 perform the following process so as to cause the first image forming section 10 and the second image forming section 20 to execute image forming processes corresponding to the same image formation command on a single sheet.

If the first master controller 110 receives multiple image formation commands before notifying the first slave controller 120 of the settings for a certain image formation command, the first master controller 110 transmits, to the second master controller 210, multiple preparation commands respectively corresponding to the multiple image formation commands. Then, the first master controller 110 executes image forming processes in the order in which multiple completion notifications respectively corresponding to the multiple preparation commands are received from the second master controller 210.

If the second master controller 210 receives multiple preparation commands before transmitting a completion notification, the second master controller 210 performs image formation preparation in the second image forming section 20 and transmits multiple completion notifications respectively corresponding to the multiple preparation commands in the order in which the multiple preparation commands are received, regardless of the order in which multiple image formation commands corresponding to the multiple preparation commands are received from an external source.

In more detail, the following description relates to an example where, before the first master controller 110 receives an image formation command and notifies the first slave controller 120 of the settings for this image formation command, the first master controller 110 receives another image formation command. The image formation command received first by the first master controller 110 will be referred to as "first command", and the image formation command received by the first master controller 110 after the first command will be referred to as "second command". Although the same process is performed when multiple second commands are received, the following description relates to a case where a single second command is received.

When the first master controller 110 receives a first command and subsequently receives a second command, the first master controller 110 transmits two preparation commands respectively corresponding to the first command and the second command to the second master controller 210 and executes image forming processes in the order in which two completion notifications respectively corresponding to the two preparation commands are received from the second master controller 210.

After receiving the preparation command corresponding to the first command, if the second master controller 210 receives the preparation command corresponding to the second command before notifying the second slave controller 220 of the image formation settings corresponding to the first command, the second master controller 210 performs the following process. Specifically, the second master controller 210 performs image formation preparation in the second image forming section 20 and transmits multiple completion notifications respectively corresponding to the two preparation commands in the order in which the two preparation commands are received, regardless of the order in which the two image formation commands corresponding to the preparation commands are received from an external source.

For example, if the second master controller 210 receives an image formation command corresponding to a first command and subsequently receives an image formation command corresponding to a second command from an external source, the second master controller 210 notifies the second slave controller 220 of the image formation settings corresponding to the first command.

Furthermore, assuming that the second master controller 210 receives an image formation command corresponding to a second command before receiving an image formation command corresponding to a first command from an external source, the second master controller 210 waits until it receives the image formation command corresponding to the first command. Then, when the second master controller 210 receives the image formation command corresponding to the first command, the second master controller 210 notifies the second slave controller 220 of the image formation settings corresponding to the first command.

An example of the process will be described below in further detail.

Figure 6B:
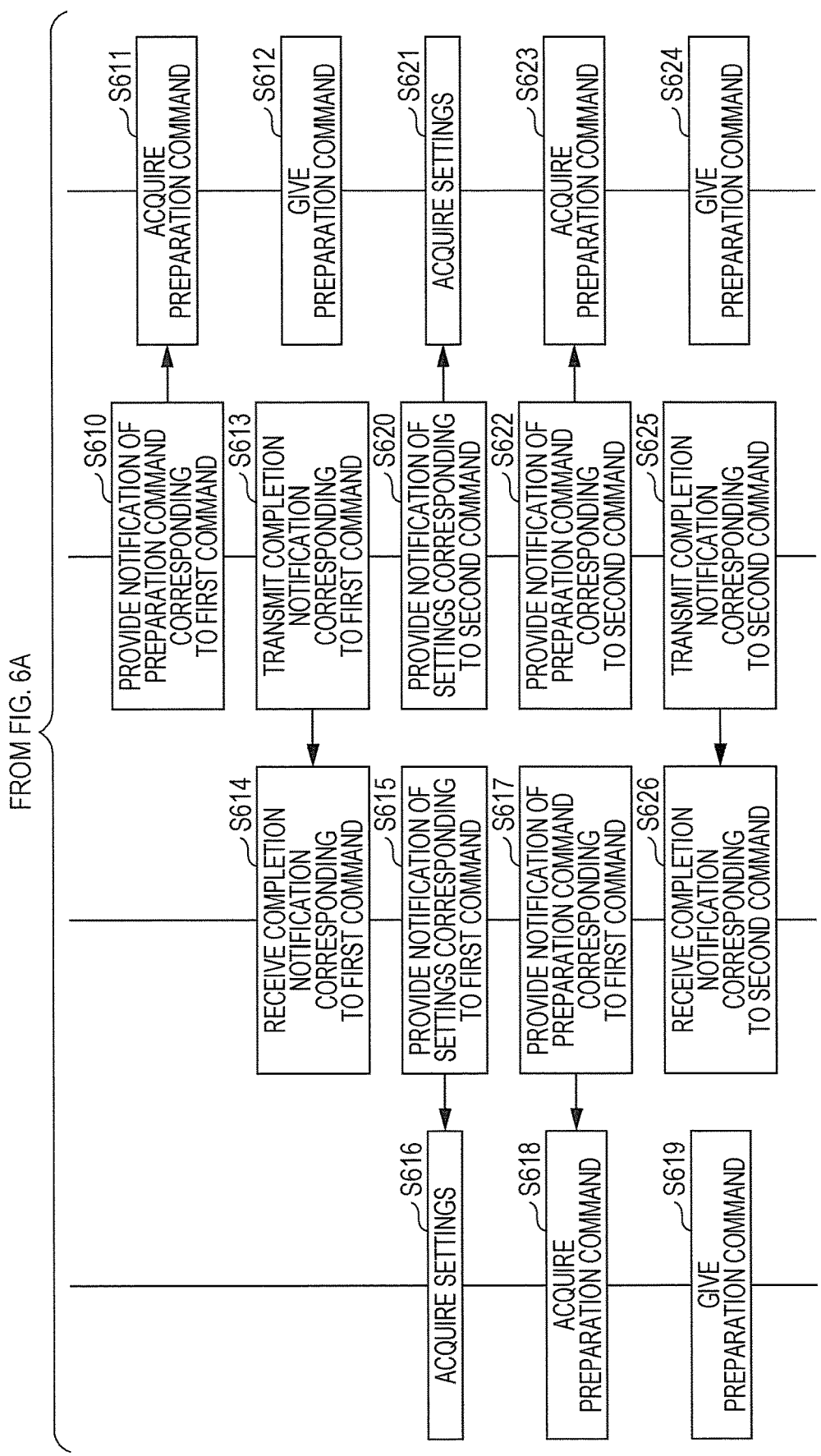
Figure 7A:
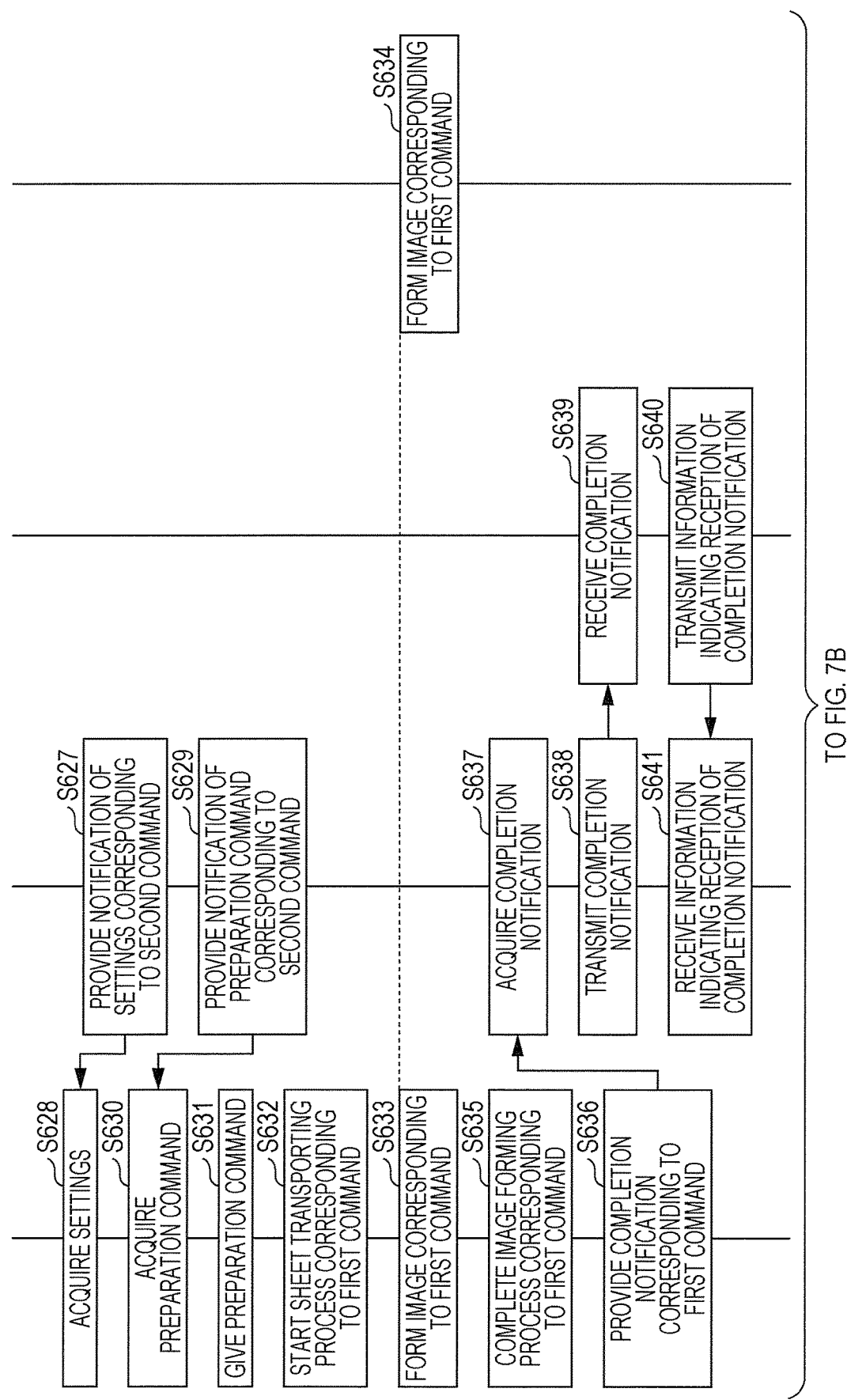

FIGS. 6A to 7B illustrate an example of the process performed by the first controller 100 and the second controller 200 when the first master controller 110 receives a first command and subsequently receives a second command. The example of the process in FIGS. 6A to 7B relates to a case where the second controller 200 receives an image formation command corresponding to the second command before receiving an image formation command corresponding to the first command. In FIGS. 6A and 6B, the first master controller 110 receives the image formation command corresponding to the second command in step S600, and receives the image formation command corresponding to the first command in step S607. In FIGS. 6A and 6B, steps identical to the steps shown in FIGS. 5A and 5B are given the same reference signs, and descriptions thereof will be omitted.

After receiving the first command in step S601, the first master controller 110 receives the second command in step S602 and determines in step S504 whether or not an error has occurred. If an error has occurred (YES in step S504), the first master controller 110 waits until the error is resolved. If an error has not occurred (NO in step S504), the first master controller 110 transmits, to the second master controller 210, a preparation command corresponding to the first command in step S603 and a preparation command corresponding to the second command in step S604.

The second master controller 210 receives, from the first master controller 110, the preparation command corresponding to the first command in step S605 and the preparation command corresponding to the second command in step S606. Then, when the second master controller 210 receives the image formation command corresponding to the first command from an external source via the communication unit 215 in step S607, the second master controller 210 notifies the second slave controller 220 of the image formation settings corresponding to the first command in step S608. Consequently, the second slave controller 220 acquires the image formation settings in step S609.

FIGS. 6A and 6B illustrate a case where the second master controller 210 receives the image formation command corresponding to the second command from an external source via the communication unit 215 before receiving the image formation command corresponding to the first command. Moreover, FIGS. 6A and 6B illustrate a case where the second master controller 210 receives the image formation command corresponding to the second command before receiving the preparation command corresponding to the first command in step S605.

Subsequently, the second master controller 210 determines in step S510 whether or not an error has occurred. If an error has not occurred (NO in step S510), the second master controller 210 notifies the second slave controller 220 of the preparation command, corresponding to the first command, for performing image formation preparation in the second image forming section 20 in step S610. After acquiring the preparation command in step S611, the second slave controller 220 commands the second image forming section 20 to perform image formation preparation in step S612.

When the image formation preparation in the second image forming section 20 is completed, the second master controller 210 transmits a completion notification indicating that the preparation corresponding to the first command is completed to the first master controller 110 in step S613.

After receiving the completion notification corresponding to the first command from the second master controller 210 in step S614, the first master controller 110 notifies the first slave controller 120 of the image formation settings corresponding to the first command in step S615. Consequently, in step S616, the first slave controller 120 acquires the image formation settings and gives a command for image formation preparation. Furthermore, in step S617, the first master controller 110 provides a notification about the preparation command, corresponding to the first command, for performing image formation preparation in the first image forming section 10. After acquiring the preparation command in step S618, the first slave controller 120 commands the first image forming section 10 to perform image formation preparation in step S619.

After transmitting a completion notification corresponding to the first command in step S613, the second master controller 210 notifies the second slave controller 220 of the image formation settings corresponding to the second command in step S620. Consequently, the second slave controller 220 acquires the image formation settings corresponding to the second command in step S621. Furthermore, in step S622, the second master controller 210 notifies the second slave controller 220 of the preparation command, corresponding to the second command, for performing image formation preparation in the second image forming section 20. After acquiring the preparation command in step S623, the second slave controller 220 commands the second image forming section 20 to perform image formation preparation in step S624. If the image formation preparation corresponding to the second command is identical to the image formation preparation corresponding to the first command given in step S612, step S624 may be omitted. Moreover, after providing the notification about the preparation command in step S622, the second master controller 210 transmits a completion notification to the first master controller 110 in step S625.

After receiving the completion notification corresponding to the second command from the second master controller 210 in step S626, the first master controller 110 notifies the first slave controller 120 of the image formation settings corresponding to the second command in step S627. Consequently, the first slave controller 120 acquires the image formation settings corresponding to the second command in step S628. Furthermore, in step S629, the first master controller 110 notifies the first slave controller 120 of the preparation command, corresponding to the second command, for performing image formation preparation in the first image forming section 10. After acquiring the preparation command in step S630, the first slave controller 120 commands the first image forming section 10 to perform image formation preparation in step S631. If the image formation preparation corresponding to the second command is identical to the image formation preparation corresponding to the first command given in step S619, step S631 may be omitted.

Subsequently, in order to execute an image forming process corresponding to the first command, the first slave controller 120 causes the sheet transporter 40 to start transporting a sheet in step S632 and causes the first image forming section 10 to form an image corresponding to the first command on the transported sheet in step S633.

In step S634, the second slave controller 220 causes the second image forming section 20 to form an image corresponding to the first command on the transported sheet.

Then, the first slave controller 120 causes the fixing device 50 to fix the toner image on the transported sheet onto the sheet and to output the sheet having undergone the fixing process onto the sheet load section 60, and completes the image forming process corresponding to the first command in step S635.

Subsequently, in step S636, the first slave controller 120 notifies the first master controller 110 that the image forming process corresponding to the first command is completed. After acquiring the completion notification in step S637, the first master controller 110 transmits the completion notification indicating that the image forming process corresponding to the first command is completed to the second master controller 210 in step S638.

After receiving the completion notification in step S639, the second master controller 210 transmits information indicating the reception of the completion notification to the first master controller 110 in step S640.

After receiving the information indicating the reception of the completion notification in step S641, the first master controller 110 transmits the information indicating the reception of the completion notification to the first slave controller 120 in step S642.

After receiving the information indicating the reception of the completion notification in step S643, the first slave controller 120 causes the sheet transporter 40 to start transporting a sheet in step S644 and causes the first image forming section 10 to form an image corresponding to the second command on the transported sheet in step S645, so as to execute an image forming process corresponding to the second command.

In step S646, the second slave controller 220 causes the second image forming section 20 to form an image corresponding to the second command on the transported sheet.

Then, the first slave controller 120 causes the fixing device 50 to fix the toner image on the transported sheet onto the sheet and to output the sheet having undergone the fixing process onto the sheet load section 60, and completes the image forming process corresponding to the second command in step S647.

Subsequently, in step S648, the first slave controller 120 notifies the first master controller 110 that the image forming process corresponding to the second command is completed. After acquiring the completion notification in step S649, the first master controller 110 transmits the completion notification indicating that the image forming process corresponding to the second command is completed to the second master controller 210 in step S650.

After receiving the completion notification in step S651, the second master controller 210 transmits information indicating the reception of the completion notification to the first master controller 110 in step S652.

After receiving the information indicating the reception of the completion notification in step S653, the first master controller 110 transmits the information indicating the reception of the completion notification to the first slave controller 120 in step S654, and ends the image forming operation in step S529. The first slave controller 120 receives the information indicating the reception of the completion notification in step S655. The end of the image forming operation includes an end of the toner-image forming process in the first image forming section 10 and a process for deleting current-image-formation-related information stored in the RAM 113 and the storage unit 114.

After transmitting the information indicating the reception of the completion notification to the first master controller 110 in step S652, the second master controller 210 ends the image forming operation in step S530. The end of the image forming operation includes an end of the toner-image forming process in the second image forming section 20 and a process for deleting current-image-formation-related information stored in the RAM 213 and the storage unit 214.

A process performed by the first master controller 110 according to the first exemplary embodiment will be described below with reference to flowcharts.

Figure 9:
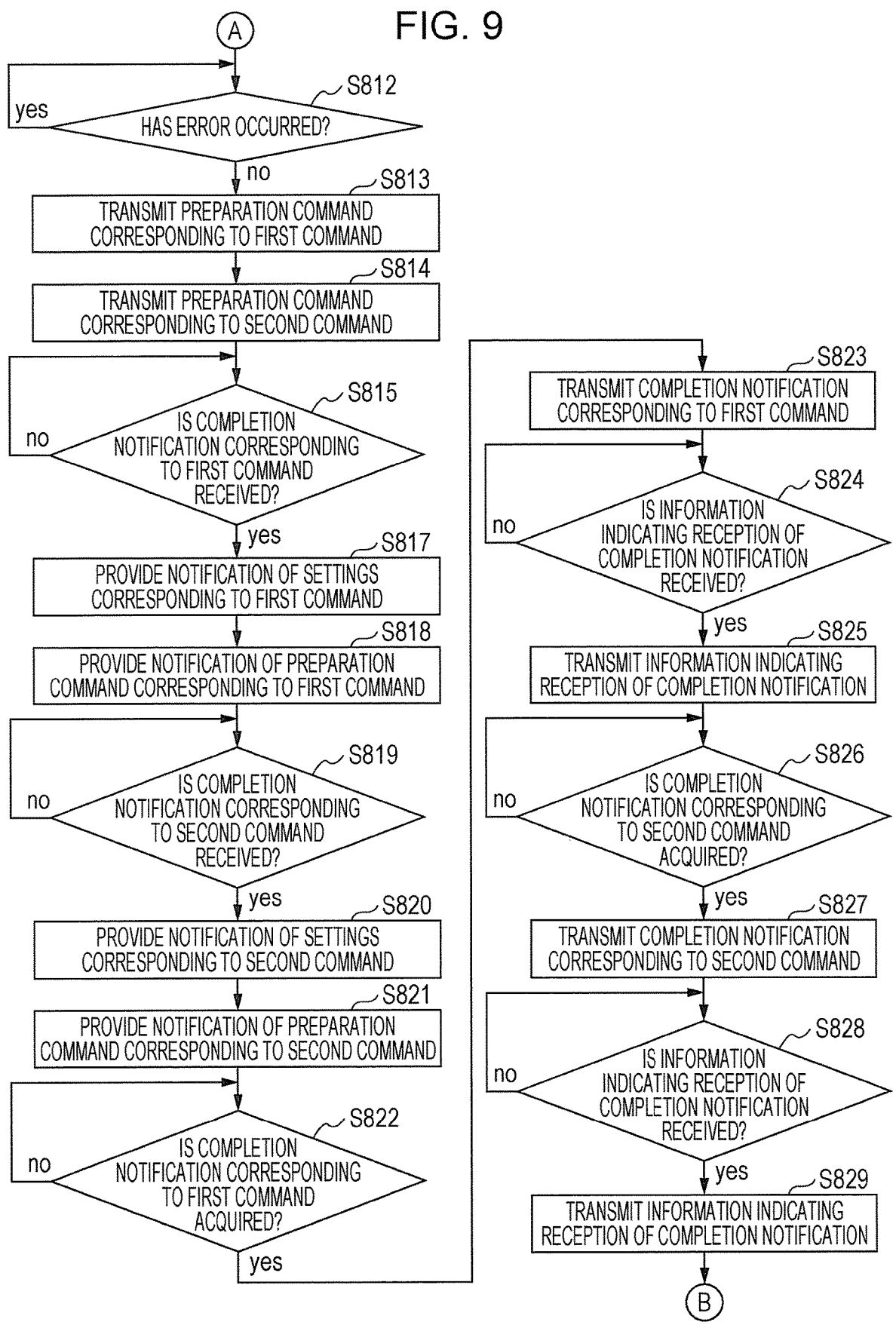
FIG. 9 is a flowchart illustrating the example of the process performed by the first master controller.

FIGS. 8 and 9 are flowcharts illustrating an example of the process performed by the first master controller 110. The first master controller 110 repeatedly performs this process at every predetermined fixed time period (e.g., 1 millisecond).

In step S801, the first master controller 110 determines whether or not a first command is received from, for example, the terminal apparatus 8. If a first command is received (YES in step S801), the first master controller 110 determines in step S802 whether or not a second command is received from, for example, the terminal apparatus 8. Then, if a second command is not received (NO in step S802), the first master controller 110 notifies the first slave controller 120 in step S803 of the image formation settings corresponding to the image formation command received in step S801. If a second command is not received (NO in step S802), the first command will be described as an image formation command below since the process is the same as the process described above with reference to FIGS. 5A and 5B.

Subsequently, the first master controller 110 determines in step S804 whether or not an error has occurred. If an error has not occurred (NO in step S804), the first master controller 110 transmits, to the second master controller 210 in step S805, a preparation command for performing image formation preparation in the second image forming section 20. In contrast, if an error has occurred (YES in step S804), the first master controller 110 waits until the error is resolved. Steps S804 and S805 respectively correspond to steps S504 and S505 described above with reference to FIGS. 5A and 5B.

Then, the first master controller 110 determines in step S806 whether or not a completion notification is received from the second master controller 210. If a completion notification is not received (NO in step S806), the first master controller 110 waits until it receives the completion notification. In contrast, if a completion notification is received (YES in step S806 (i.e., this step corresponds to step S515 described above with reference to FIGS. 5A and 5B)), the first master controller 110 notifies the first slave controller 120 of the preparation command for performing image formation preparation in the first image forming section 10 in step S807. Step S807 corresponds to step S516 described above with reference to FIGS. 5A and 5B.

Subsequently, in step S808, the first master controller 110 determines whether or not a completion notification indicating that the image forming process is completed is acquired from the first slave controller 120. If a completion notification is not acquired (NO in step S808), the first master controller 110 waits until it acquires a completion notification. In contrast, if a completion notification is acquired (YES in step S808), the first master controller 110 transmits the completion notification indicating that the image forming process is completed to the second master controller 210 in step S809. Step S809 corresponds to step S525 described above with reference to FIGS. 5A and 5B.

Subsequently, the first master controller 110 determines in step S810 whether or not information indicating the reception of the completion notification is received from the second master controller 210. Then, if information indicating the reception of the completion notification is received (YES in step S810 (i.e., this step corresponds to step S528 described above with reference to FIGS. 5A and 5B)), the first master controller 110 ends the image forming operation in step S811. In contrast, if information indicating the reception of the completion notification is not received (NO in step S810), the first master controller 110 waits until it receives the information.

On the other hand, if a second command is received in step S802 (YES in step S802 (i.e., this step corresponds to step S602 described above with reference to FIGS. 6A and 6B)), the first master controller 110 determines in step S812 whether or not an error has occurred. If an error has occurred (YES in step S812), the first master controller 110 waits until the error is resolved. In contrast, if an error has not occurred (NO in step S812), the first master controller 110 transmits, to the second master controller 210 in step S813, a preparation command, corresponding to the first command, for performing image formation preparation in the second image forming section 20. Then, the first master controller 110 transmits, to the second master controller 210 in step S814, a preparation command, corresponding to the second command, for performing image formation preparation in the second image forming section 20. Steps S812, S813, and S814 respectively correspond to steps S504, S603, and S604 described above with reference to FIGS. 6A and 6B.

Subsequently, the first master controller 110 determines in step S815 whether or not a completion notification corresponding to the first command is received from the second master controller 210. If a completion notification is not received (NO in step S815), the first master controller 110 waits until it receives the completion notification. In contrast, if a completion notification is received (YES in step S815 (i.e., this step corresponds to step S614 described above with reference to FIGS. 6A and 6B)), the first master controller 110 provides a notification about the image formation settings corresponding to the first command in step S817. Moreover, the first master controller 110 provides a notification about the preparation command, corresponding to the first command, for performing image formation preparation in the first image forming section 10 in step S818. Steps S817 and S818 respectively correspond to steps S615 and S616 described above with reference to FIGS. 6A and 6B.

Subsequently, the first master controller 110 determines in step S819 whether or not a completion notification corresponding to the second command is received from the second master controller 210. If a completion notification is not received (NO in step S819), the first master controller 110 waits until it receives the completion notification. In contrast, if a completion notification is acquired (YES in step S819 (i.e., this step corresponds to step S626 described above with reference to FIGS. 6A and 6B)), the first master controller 110 notifies the first slave controller 120 of the image formation settings corresponding to the second command in step S820. Moreover, the first master controller 110 notifies the first slave controller 120 of the preparation command, corresponding to the second command, for performing image formation preparation in the first image forming section 10 in step S821. Steps S820 and S821 respectively correspond to steps S627 and S628 described above with reference to FIGS. 7A and 7B.

Subsequently, the first master controller 110 determines in step S822 whether or not a completion notification indicating that the image forming process corresponding to the first command is completed is acquired from the first slave controller 120. If a completion notification is not acquired (NO in step S822), the first master controller 110 waits until it acquires the completion notification. In contrast, if a completion notification is acquired (YES in step S822 (i.e., this step corresponds to step S637 described above with reference to FIGS. 7A and 7B)), the first master controller 110 transmits, to the second master controller 210 in step S823, the completion notification indicating that the image forming process corresponding to the first command is completed. Step S823 corresponds to step S638 described above with reference to FIGS. 6A and 6B.

Subsequently, the first master controller 110 determines in step S824 whether or not information indicating the reception of the completion notification is received from the second master controller 210. If information indicating the reception of the completion notification is not received (NO in step S824), the first master controller 110 waits until it receives the information. In contrast, if information indicating the reception of the completion notification is received (YES in step S824 (i.e., this step corresponds to step S641 described above with reference to FIGS. 7A and 7B)), the first master controller 110 transmits the information indicating the reception to the first slave controller 120 in step S825. Step S825 corresponds to step S642 described above with reference to FIGS. 7A and 7B.

Subsequently, the first master controller 110 determines in step S826 whether or not a completion notification indicating that the image forming process corresponding to the second command is completed is acquired from the first slave controller 120. If a completion notification is not acquired (NO in step S826), the first master controller 110 waits until it acquires the completion notification. In contrast, if a completion notification is acquired (YES in step S826 (i.e., this step corresponds to step S649 described above with reference to FIGS. 7A and 7B)), the first master controller 110 transmits, to the second master controller 210 in step S827, the completion notification indicating that the image forming process is completed. Step S827 corresponds to step S650 described above with reference to FIGS. 7A and 7B.

Subsequently, the first master controller 110 determines in step S828 whether or not information indicating the reception of the completion notification is received from the second master controller 210. If information indicating the reception of the completion notification is received (YES in step S828 (i.e., this step corresponds to step S653 described above with reference to FIGS. 7A and 7B)), the first master controller 110 transmits the information indicating the reception to the first slave controller 120 in step S829. Step S829 corresponds to step S654 described above with reference to FIGS. 7A and 7B. Then, the first master controller 110 ends the image forming operation in step S811. In contrast, if information indicating the reception of the completion notification is not received (NO in step S828), the first master controller 110 waits until it receives the information.

A process performed by the second master controller 210 according to this exemplary embodiment will be described below with reference to flowcharts.

Figure 10:
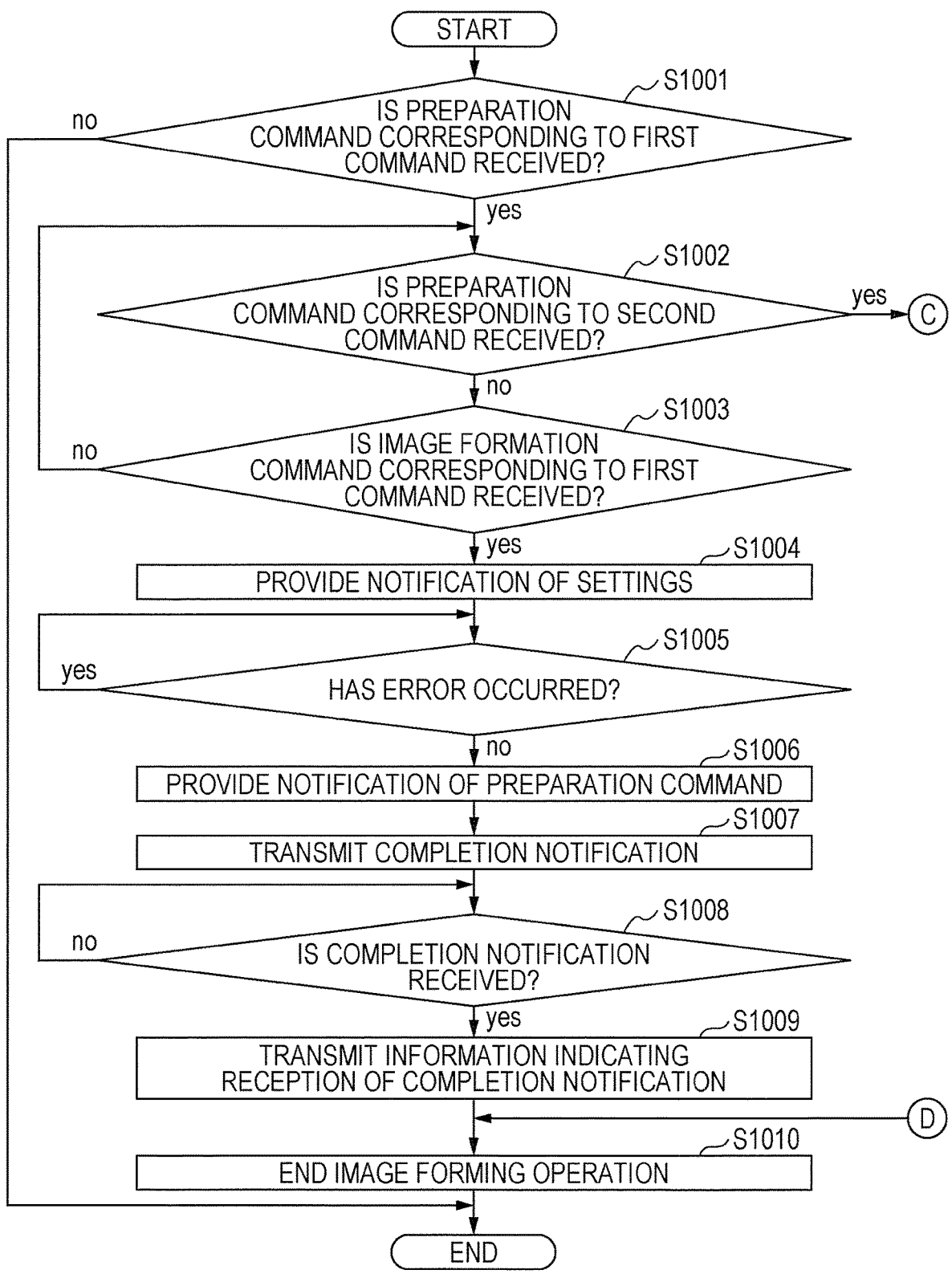
FIG. 10 is a flowchart illustrating an example of a process performed by a second master controller.
Figure 11:
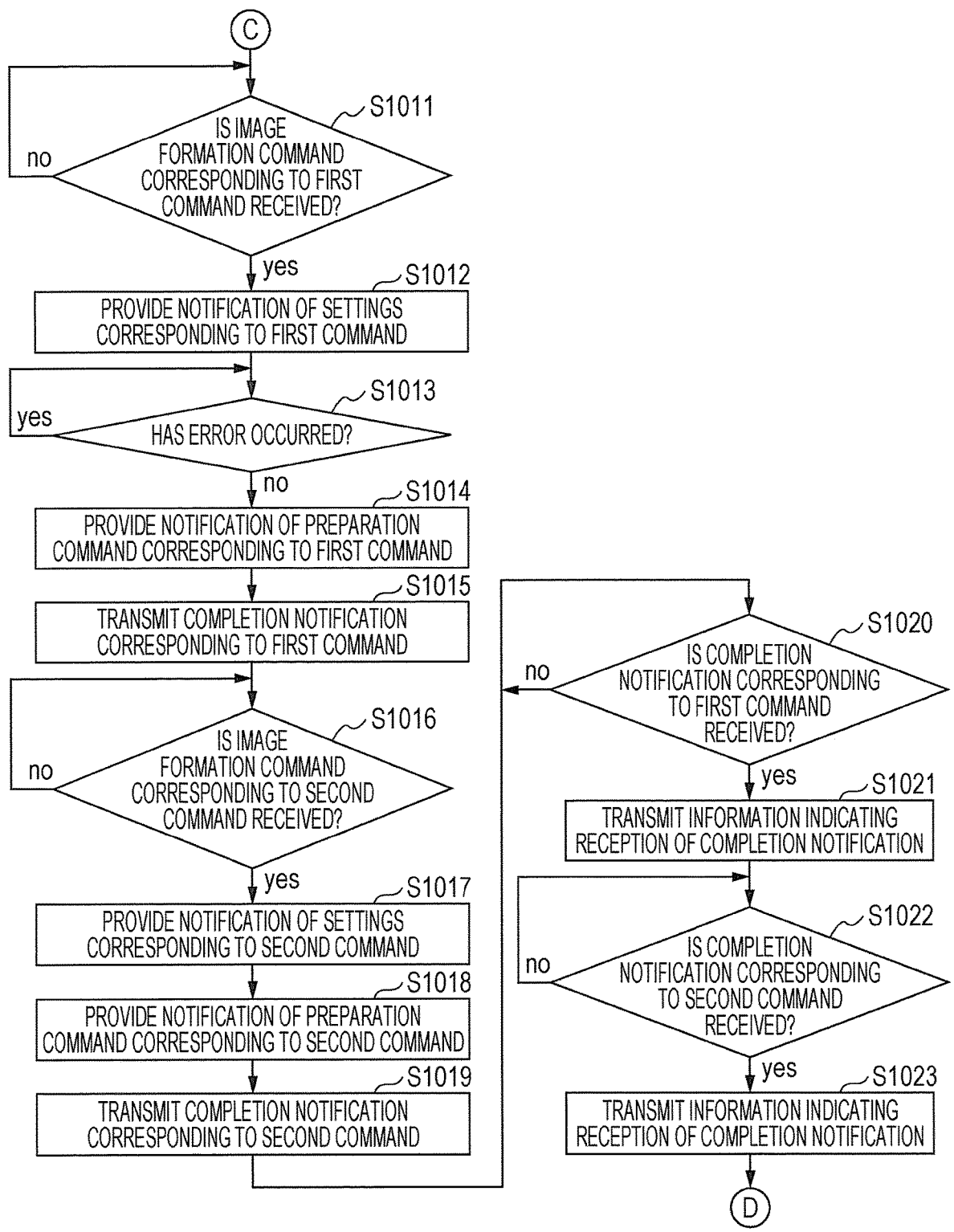
FIG. 11 is a flowchart illustrating the example of the process performed by the second master controller.

FIGS. 10 and 11 are flowcharts illustrating an example of the process performed by the second master controller 210. The second master controller 210 repeatedly performs this process at every predetermined fixed time period (e.g., 1 millisecond).

In step S1001, the second master controller 210 determines whether or not a preparation command corresponding to a first command is received from the first master controller 110. If a preparation command corresponding to a first command is received (YES in step S1001 (i.e., this step corresponds to step S506 described above with reference to FIGS. 5A and 5B or step S605 described above with reference to FIGS. 6A and 6B)), the second master controller 210 determines in step S1002 whether or not a preparation command corresponding to a second command is received from the first master controller 110. If a preparation command corresponding to a second command is not received (NO in step S1002), the second master controller 210 determines in step S1003 whether or not an image formation command corresponding to the first command is received from an external source, such as the terminal apparatus 8. If an image formation command corresponding to the first command is received (YES in step S1003 (i.e., this step corresponds to step S507 described above with reference to FIGS. 5A and 5B)), the second master controller 210 notifies the second slave controller 220 of the designated image formation settings in step S1004. In a case where an image formation command corresponding to the first command is received (YES in step S1003), if the second master controller 210 receives the image formation command corresponding to the first command (YES in step S1003) without receiving a preparation command corresponding to a second command (NO in step S1002), the first command will be described as an image formation command below since the process is the same as the process described above with reference to FIGS. 5A and 5B.

Subsequently, the second master controller 210 determines in step S1005 whether or not an error has occurred in the second image forming section 20. Step S1005 corresponds to step S510 described above with reference to FIGS. 5A and 5B. If an error has occurred (YES in step S1005), the second master controller 210 waits until the error is resolved. In contrast, if an error has not occurred (NO in step S1005), the second master controller 210 notifies the second slave controller 220 of the preparation command for performing image formation preparation in the second image forming section 20 in step S1006. Then, the second master controller 210 transmits a completion notification to the first master controller 110 in step S1007. Step S1007 corresponds to step S514 described above with reference to FIGS. 5A and 5B.

Subsequently, the second master controller 210 determines in step S1008 whether or not a completion notification indicating that the image forming process is completed is received from the first master controller 110. If a completion notification is received (YES in step S1008 (i.e., this step corresponds to step S526 described above with reference to FIGS. 5A and 5B)), the second master controller 210 transmits information indicating the reception of the completion notification to the first master controller 110 in step S1009. Step S1009 corresponds to step S527 described above with reference to FIGS. 5A and 5B. Then, the second master controller 210 ends the image forming operation in step S1010. In contrast, if a completion notification is not received (NO in step S1008), the second master controller 210 waits until it receives the completion notification.

On the other hand, if a preparation command corresponding to a second command is received (YES in step S1002 (i.e., this step corresponds to step S606 described above with reference to FIGS. 6A and 6B)), the second master controller 210 determines in step S1011 whether or not an image formation command corresponding to the first command is received from an external source, such as the terminal apparatus 8. If an image formation command corresponding to the first command is not received (NO in step S1011), the second master controller 210 waits until it receives the image formation command corresponding to the first command. In contrast, if an image formation command corresponding to the first command is received (YES in step S1011 (i.e., this step corresponds to step S607 described above with reference to FIGS. 6A and 6B)), the second master controller 210 notifies the second slave controller 220 of the image formation settings corresponding to the first command in step S1012. Step S1012 corresponds to step S608 described above with reference to FIGS. 6A and 6B.

Subsequently, the second master controller 210 determines in step S1013 whether or not an error has occurred in the second image forming section 20. If an error has occurred (YES in step S1013), the second master controller 210 waits until the error is resolved. In contrast, if an error has not occurred (NO in step S1013), the second master controller 210 notifies the second slave controller 220 of the preparation command, corresponding to the first command, for performing image formation preparation in the second image forming section 20 in step S1014. Step S1014 corresponds to step S610 described above with reference to FIGS. 6A and 6B. Then, the second master controller 210 transmits a completion notification corresponding to the first command to the first master controller 110 in step S1015. Step S1015 corresponds to step S613 described above with reference to FIGS. 6A and 6B.

Subsequently, the second master controller 210 determines in step S1016 whether or not an image formation command corresponding to the second command is received from an external source, such as the terminal apparatus 8. If an image formation command corresponding to the second command is not received (NO in step S1016), the second master controller 210 waits until it receives the image formation command corresponding to the second command. In contrast, if an image formation command corresponding to the second command is received (YES in step S1016), the second master controller 210 notifies the second slave controller 220 of the image formation settings corresponding to the second command in step S1017. Step S1017 corresponds to step S620 described above with reference to FIGS. 6A and 6B. Subsequently, the second master controller 210 notifies the second slave controller 220 of the preparation command, corresponding to the second command, for performing image formation preparation in the second image forming section 20 in step S1018. Step S1018 corresponds to step S622 described above with reference to FIGS. 6A and 6B. Then, the second master controller 210 transmits a completion notification corresponding to the second command to the first master controller 110 in step S1019. Step S1019 corresponds to step S625 described above with reference to FIGS. 6A and 6B.

Subsequently, the second master controller 210 determines in step S1020 whether or not a completion notification indicating that the image forming process corresponding to the first command is completed is received from the first master controller 110. If a completion notification is not received (NO in step S1020), the second master controller 210 waits until it receives the completion notification. In contrast, if a completion notification is received (YES in step S1020 (i.e., this step corresponds to step S639 described above with reference to FIGS. 7A and 7B)), the second master controller 210 transmits, to the first master controller 110 in step S1021, information indicating the reception of the completion notification. Step S1021 corresponds to step S640 described above with reference to FIGS. 7A and 7B.

Subsequently, the second master controller 210 determines in step S1022 whether or not a completion notification indicating that the image forming process corresponding to the second command is completed is received from the first master controller 110. If a completion notification is not received (NO in step S1022), the second master controller 210 waits until it receives the completion notification. In contrast, if a completion notification is received (YES in step S1022 (i.e., this step corresponds to step S651 described above with reference to FIGS. 7A and 7B)), the second master controller 210 transmits, to the first master controller 110 in step S1023, information indicating the reception of the completion notification. Step S1023 corresponds to step S652 described above with reference to FIGS. 7A and 7B. Then, the second master controller 210 ends the image forming operation in step S1010.

In the exemplary embodiment above, the functions of the first controller 100 are executed by the CPU 111 of the first master controller 110 and the CPU 121 of the first slave controller 120 operating in cooperation with each other. Alternatively, the configuration is not particularly limited to that described above. For example, the functions of the first controller 100 may be realized by a single processor, or may be realized by using three or more processors. Likewise, in the exemplary embodiment above, the functions of the second controller 200 are executed by the CPU 211 of the second master controller 210 and the CPU 221 of the second slave controller 220 operating in cooperation with each other. Alternatively, the configuration is not particularly limited to that described above. For example, the functions of the second controller 200 may be realized by a single processor, or may be realized by using three or more processors. In the exemplary embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

The image forming apparatus 2 described above includes the CPU 111 and the CPU 121 as an example of a first processor configured to control the sheet transporter 40 serving as an example of a transporter that transports a sheet and the first image forming section 10 that forms an image on the sheet transported by the sheet transporter 40, and the CPU 211 and the CPU 221 as an example of a second processor configured to control the second image forming section 20 that forms an image on the sheet transported by the sheet transporter 40.

When the first processor and the second processor receive a single image formation command from an external source, the first processor transmits a preparation command for performing image formation preparation in the second image forming section 20 to the second processor (step S505). When the second processor receives the preparation command (step S506), the second processor commands the second image forming section 20 to perform image formation preparation (step S513), and transmits a completion notification to the first processor (step S514) upon completion of the image formation preparation. After receiving the completion notification (step S515), the first processor causes the sheet transporter 40 to transport a sheet and executes an image forming process for forming an image at the first image forming section 10.

If the first processor receives multiple image formation commands from an external source before transmitting a preparation command to the second processor (steps S601 and S602), the first processor transmits multiple preparation commands respectively corresponding to the multiple image formation commands to the second processor (steps S603 and S604), and executes image forming processes in the order in which multiple completion notifications respectively corresponding to the multiple preparation commands are received from the second processor (steps S614 and S626).

Accordingly, the first processor executes image forming processes in the order in which the multiple completion notifications are received from the second processor, so that image forming processes corresponding to the same image formation command are executed on a single sheet by the first image forming section 10 and the second image forming section 20.

If the second processor receives multiple preparation commands (steps S605 and S606) before receiving a completion notification (step S613), the second processor performs image formation preparation in the second image forming section 20 (steps S612 and S624) and transmits multiple completion notifications respectively corresponding to the multiple preparation commands (steps S613 and S625) in the order in which the multiple preparation commands are received, regardless of the order in which multiple image formation commands respectively corresponding to the multiple preparation commands are received from an external source (steps S600 and S607).

Accordingly, image forming processes are executed in the same order as the order in which the multiple image formation commands are received by the first processor, so that highly-reliable image forming processes corresponding to the same image formation command may be executed on a single sheet by the first image forming section 10 and the second image forming section 20.

Furthermore, when the second processor receives multiple preparation commands (steps S605 and S606), the second processor waits until it receives an image formation command (S607) corresponding to a preparation command received first (step S605) even if the second processor has already received an image formation command (step S600) not corresponding to the first-received preparation command (step S605).

Accordingly, image forming processes are executed in the same order as the order in which the multiple image formation commands are received by the first processor, so that highly-reliable image forming processes corresponding to the same image formation command may be executed on a single sheet by the first image forming section 10 and the second image forming section 20.

The programs executed by the CPU 111 of the first master controller 110, the CPU 121 of the first slave controller 120, the CPU 211 of the second master controller 210, and the CPU 221 of the second slave controller 220 may each be provided by being stored in a computer-readable storage medium, such as a magnetic storage medium (e.g., magnetic tape or a magnetic disk), an optical storage medium (e.g., an optical disk), a magneto-optical storage medium, or a semiconductor memory, or may each be downloaded by using a communication unit, such as the Internet.

A program according to an exemplary embodiment of the disclosure causes the first processor to execute a function. The first processor is configured to control the sheet transporter 40 that transports a sheet and the first image forming section 10 that forms an image on the sheet transported by the sheet transporter 40. The second processor is configured to control the second image forming section 20 that forms an image on the sheet transported by the sheet transporter 40. The function of the first processor includes transmitting a preparation command for performing image formation preparation in the second image forming section 20 to the second processor if the first processor and the second processor receive a single image formation command from an external source. Furthermore, the program according to the exemplary embodiment of the disclosure also causes the second processor to execute a function and the first processor to execute a function. The function of the second processor includes performing image formation preparation in the second image forming section 20 when the second processor receives the preparation command, and transmitting a completion notification to the first processor when the image formation preparation is completed. The function of the first processor includes executing an image forming process involving causing the sheet transporter 40 to transport a sheet and causing the first image forming section 10 to form an image after the first processor receives the completion notification. Moreover, in the program according to the exemplary embodiment of the disclosure, if the first processor receives multiple image formation commands from an external source before the first processor transmits the preparation command to the second processor, the first processor is caused to transmit multiple preparation commands respectively corresponding to the multiple image formation commands to the second processor and to execute image forming processes in the order in which multiple completion notifications respectively corresponding to the multiple preparation commands are received from the second processor.

Second Exemplary Embodiment

In a second exemplary embodiment, a process performed by the second master controller 210 is different from that in the first exemplary embodiment. The differences between the first exemplary embodiment and the second exemplary embodiment will be described below. Detailed descriptions of identical features will be omitted.

The second master controller 210 according to the second exemplary embodiment performs image formation preparation in the second image forming section 20 and transmits multiple completion notifications respectively corresponding to multiple preparation commands in the order in which multiple image formation commands respectively corresponding the multiple preparation commands are received from an external source, regardless of the order in which the multiple preparation commands are received from the first master controller 110.

In other words, the second master controller 210 receives preparation commands from the first master controller 110, and performs image formation preparation in the second image forming section 20 and transmits multiple completion notifications respectively corresponding to the multiple preparation commands in the order in which image formation commands are received from an external source.

For example, in a case where the second master controller 210 has received an image formation command corresponding to a first command from an external source when receiving a preparation command corresponding to the first command from the first master controller 110, the second master controller 210 notifies the second slave controller 220 of the image formation settings corresponding to the first command so as to cause the second image forming section 20 to form an image corresponding to the first command.

Furthermore, in a case where the second master controller 210 has not received an image formation command corresponding to a first command when receiving a preparation command corresponding to the first command from the first master controller 110, and subsequently receives an image formation command corresponding to a second command when receiving a preparation command corresponding to the second command, the second master controller 210 notifies the second slave controller 220 of the image formation settings corresponding to the second command so as to cause the second image forming section 20 to form an image corresponding to the second command.

Furthermore, in a case where the second master controller 210 has not received image formation commands corresponding to a first command and a second command when receiving preparation commands corresponding to the first command and the second command from the first master controller 110, and subsequently receives an image formation command corresponding to the first command, the second master controller 210 notifies the second slave controller 220 of the image formation settings corresponding to the first command so as to cause the second image forming section 20 form an image corresponding to the first command.

Furthermore, in a case where the second master controller 210 has not received image formation commands corresponding to a first command and a second command when receiving preparation commands corresponding to the first command and the second command from the first master controller 110, and subsequently receives an image formation command corresponding to the second command, the second master controller 210 notifies the second slave controller 220 of the image formation settings corresponding to the second command so as to cause the second image forming section 20 form an image corresponding to the second command.

The following description relates to a process performed in a case where the second master controller 210 has not received an image formation command corresponding to a first command but has received an image formation command corresponding to a second command when receiving the first command and the second command from the first master controller 110.

Figure 12A:
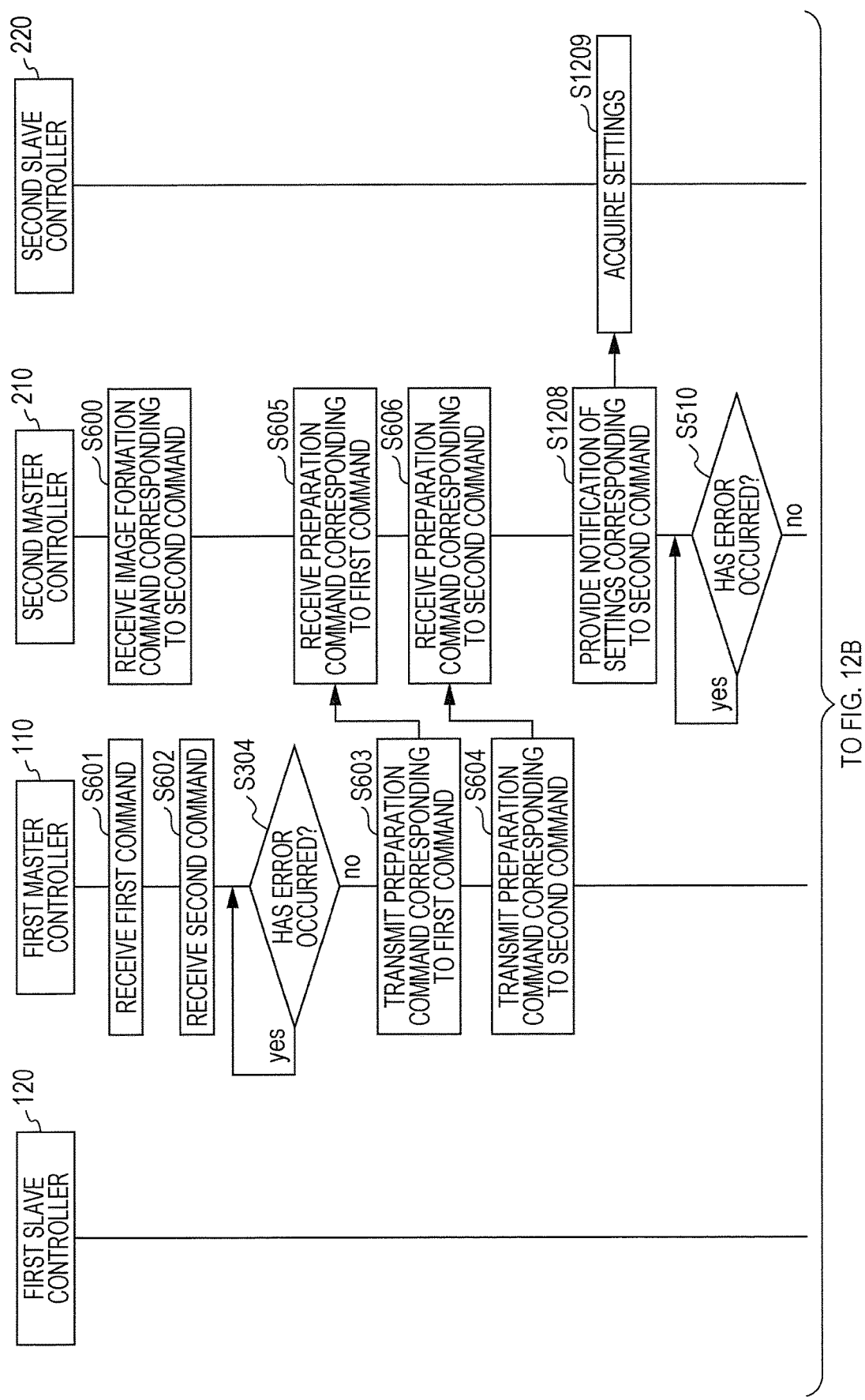
FIGS. 12A and 12B illustrate an example of a process performed by the first controller and the second controller.
Figure 12B:
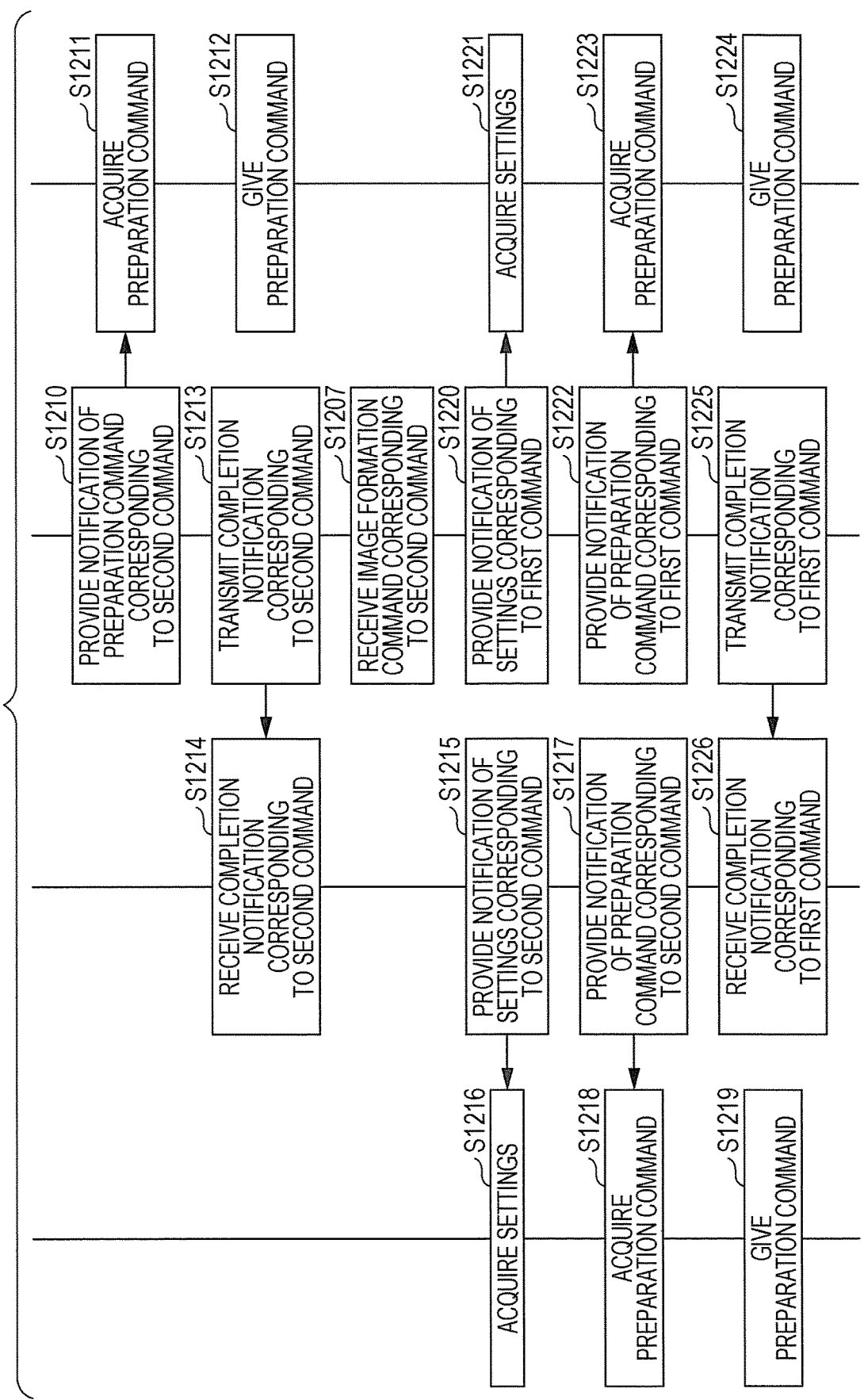

FIGS. 12A to 13B illustrate an example of a process performed by the first controller 100 and the second controller 200 when the first master controller 110 receives a first command and subsequently receives a second command. The example of the process in FIGS. 12A to 13B relates to a case where the second controller 200 receives an image formation command corresponding to the second command before receiving an image formation command corresponding to the first command. In FIGS. 12A and 12B, the first master controller 110 receives the image formation command corresponding to the second command in step S600, and receives the image formation command corresponding to the first command in step S1207. In FIGS. 12A to 13B, steps identical to the steps shown in FIGS. 6A to 7B are given the same reference signs, and descriptions thereof will be omitted.

In more detail, when the second master controller 210 receives, from the first master controller 110, a preparation command corresponding to the first command in step S605 and a preparation command corresponding to the second command in step S606, if an image formation command corresponding to the first command is not received but an image formation command corresponding to the second command is received, the second master controller 210 notifies the second slave controller 220 of the image formation settings corresponding to the second command in step S1208. Consequently, the second slave controller 220 acquires the image formation settings corresponding to the second command in step S1209.

Subsequently, the second master controller 210 determines in step S510 whether or not an error has occurred. If an error has not occurred (NO in step S510), the second master controller 210 notifies the second slave controller 220 of the preparation command, corresponding to the second command, for performing image formation preparation in the second image forming section 20 in step S1210. After acquiring the preparation command in step S1211, the second slave controller 220 commands the second image forming section 20 to perform image formation preparation in step S1212.

When the image formation preparation in the second image forming section 20 is completed, the second master controller 210 transmits a completion notification indicating that the preparation corresponding to the second command is completed to the first master controller 110 in step S1213.

After receiving the completion notification corresponding to the second command from the second master controller 210 in step S1214, the first master controller 110 notifies the first slave controller 120 of the image formation settings corresponding to the second command in step S1215. Consequently, in step S1216, the first slave controller 120 acquires the image formation settings corresponding to the second command and gives a command for image formation preparation. Furthermore, in step S1217, the first master controller 110 provides a notification about the preparation command, corresponding to the second command, for performing image formation preparation in the first image forming section 10. After acquiring the preparation command in step S1218, the first slave controller 120 commands the first image forming section 10 to perform image formation preparation in step S1219.

After transmitting the completion notification corresponding to the second command in step S1213, the second master controller 210 receives an image formation command corresponding to the first command in step S1207 and subsequently notifies the second slave controller 220 of the image formation settings corresponding to the first command in step S1220. Consequently, the second slave controller 220 acquires the image formation settings corresponding to the first command in step S1221. Furthermore, in step S1222, the second master controller 210 notifies the second slave controller 220 of the preparation command, corresponding to the first command, for performing image formation preparation in the second image forming section 20. After acquiring the preparation command in step S1223, the second slave controller 220 commands the second image forming section 20 to perform image formation preparation in step S1224. The image formation command corresponding to the first command may be received before the notification about the preparation command corresponding to the second command is provided in step S1210 or before the completion notification corresponding to the second command is transmitted in step S1213, so long as the image formation command corresponding to the first command is received after the notification about the image formation settings corresponding to the second command is provided in step S1208.

After providing the notification about the preparation command corresponding to the first command in step S1222, the second master controller 210 transmits a completion notification corresponding to the first command to the first master controller 110 in step S1225.

After receiving the completion notification corresponding to the first command from the second master controller 210 in step S1226, the first master controller 110 notifies the first slave controller 120 of the image formation settings corresponding to the first command in step S1227. Consequently, in step S1228, the first slave controller 120 acquires the image formation settings corresponding to the first command. Furthermore, in step S1229, the first master controller 110 notifies the first slave controller 120 of the preparation command, corresponding to the first command, for performing image formation preparation in the first image forming section 10. After acquiring the preparation command in step S1230, the first slave controller 120 commands the first image forming section 10 to perform image formation preparation in step S1231.

Subsequently, in order to execute an image forming process corresponding to the second command, the first slave controller 120 causes the sheet transporter 40 to start transporting a sheet in step S1232 and causes the first image forming section 10 to form an image corresponding to the second command on the transported sheet in step S1233.

In step S1234, the second slave controller 220 causes the second image forming section 20 to form an image corresponding to the second command on the transported sheet.

Then, the first slave controller 120 causes the fixing device 50 to fix the toner image on the transported sheet onto the sheet and to output the sheet having undergone the fixing process onto the sheet load section 60, and completes the image forming process corresponding to the second command in step S1235.

Subsequently, in step S1236, the first slave controller 120 notifies the first master controller 110 that the image forming process corresponding to the second command is completed. After acquiring the completion notification in step S1237, the first master controller 110 transmits the completion notification indicating that the image forming process corresponding to the second command is completed to the second master controller 210 in step S1238.

After receiving the completion notification in step S1239, the second master controller 210 transmits information indicating the reception of the completion notification to the first master controller 110 in step S1240.

After receiving the information indicating the reception of the completion notification in step S1241, the first master controller 110 transmits the information indicating the reception of the completion notification to the first slave controller 120 in step S1242.

After receiving the information indicating the reception of the completion notification in step S1243, the first slave controller 120 causes the sheet transporter 40 to start transporting a sheet in step S1244 and causes the first image forming section 10 to form an image corresponding to the first command on the transported sheet in step S1245, so as to execute an image forming process corresponding to the first command.

In step S1246, the second slave controller 220 causes the second image forming section 20 to form an image corresponding to the first command on the transported sheet.

Then, the first slave controller 120 causes the fixing device 50 to fix the toner image on the transported sheet onto the sheet and to output the sheet having undergone the fixing process onto the sheet load section 60, and completes the image forming process corresponding to the first command in step S1247.

Subsequently, in step S1248, the first slave controller 120 notifies the first master controller 110 that the image forming process corresponding to the first command is completed. After acquiring the completion notification in step S1249, the first master controller 110 transmits the completion notification indicating that the image forming process corresponding to the first command is completed to the second master controller 210 in step S1250.

After receiving the completion notification in step S1251, the second master controller 210 transmits information indicating the reception of the completion notification to the first master controller 110 in step S1252.

After receiving the information indicating the reception of the completion notification in step S1253, the first master controller 110 transmits the information indicating the reception of the completion notification to the first slave controller 120 in step S1254, and ends the image forming operation in step S529. The first slave controller 120 receives the information indicating the reception of the completion notification in step S1255. After transmitting the information indicating the reception of the completion notification to the first master controller 110 in step S1252, the second master controller 210 ends the image forming operation in step S530.

A process performed by the first master controller 110 according to the second exemplary embodiment will be described below with reference to flowcharts.

Figure 14:
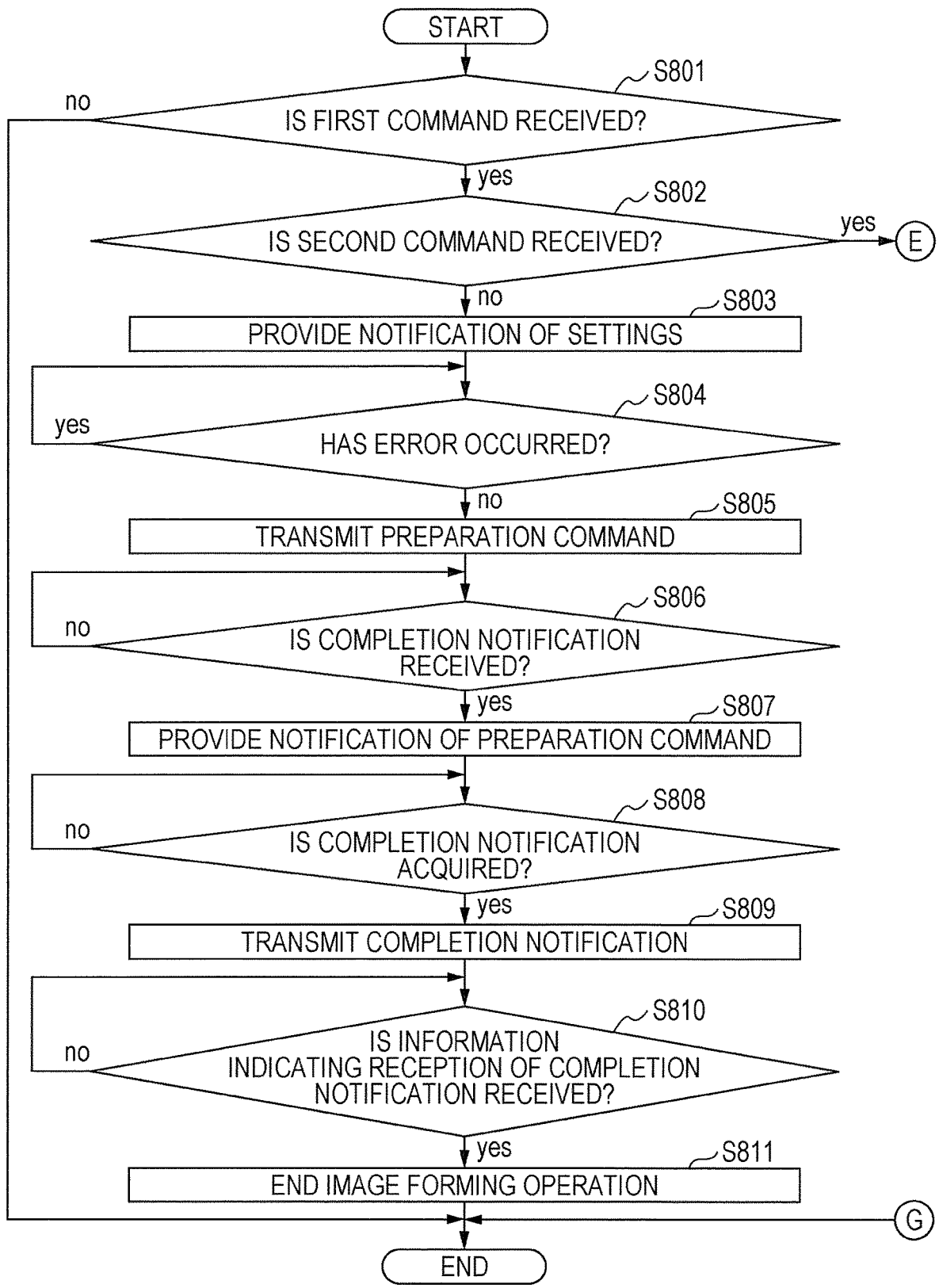
FIG. 14 is a flowchart illustrating an example of a process performed by the first master controller according to a second exemplary embodiment.
Figure 15:
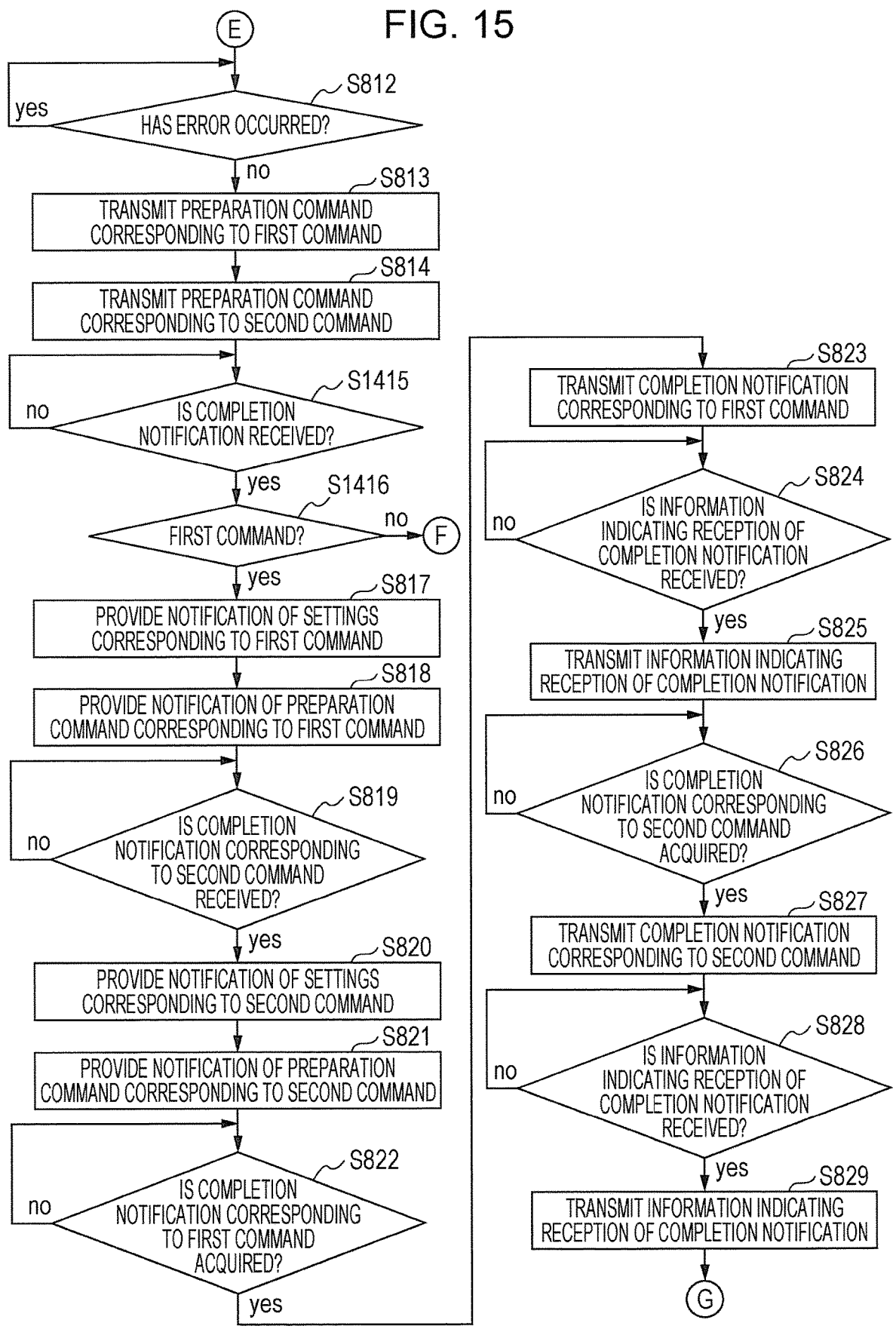
FIG. 15 is a flowchart illustrating the example of the process performed by the first master controller according to the second exemplary embodiment.
Figure 16:
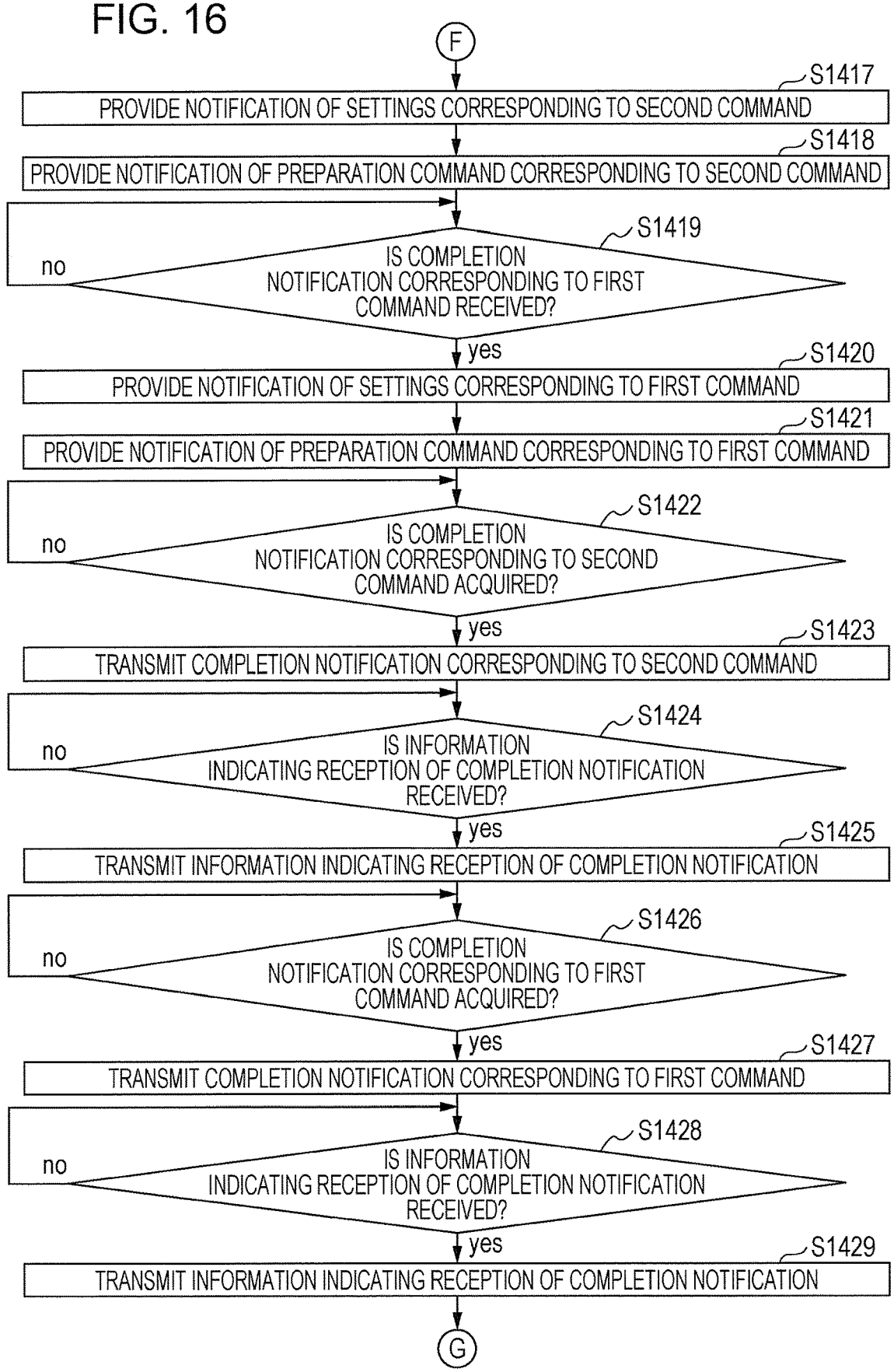
FIG. 16 is a flowchart illustrating the example of the process performed by the first master controller according to the second exemplary embodiment.

FIGS. 14, 15, and 16 are flowcharts illustrating an example of the process performed by the first master controller 110 according to the second exemplary embodiment. The first master controller 110 repeatedly performs this process at every predetermined fixed time period (e.g., 1 millisecond). In FIGS. 14, 15, and 16, steps identical to the steps shown in FIGS. 8 and 9 are given the same reference signs, and descriptions thereof will be omitted.

After transmitting the preparation command, corresponding to the second command, for performing image formation preparation in the second image forming section 20 to the second master controller 210 in step S814, the first master controller 110 determines in step S1415 whether or not a completion notification is received from the second master controller 210. If a completion notification is not received (NO in step S1415), the first master controller 110 waits until it receives the completion notification. If a completion notification is received (YES in step S1415), the first master controller 110 determines in step S1416 whether or not the received completion notification is a completion notification corresponding to the first command. If the received completion notification is a completion notification corresponding to the first command (YES in step S1416), the first master controller 110 provides a notification about the image formation settings corresponding to the first command in step S817. Moreover, the first master controller 110 provides a notification about the preparation command, corresponding to the first command, for performing image formation preparation in the first image forming section 10 in step S818. Subsequently, steps S819 to S828 are performed.

In contrast, if the received completion notification is not a completion notification corresponding to the first command in step S1416 (NO in step S1416 (i.e., this step corresponds to step S1214 described above with reference to FIGS. 12A and 12B)), the first master controller 110 provides a notification about the image formation settings corresponding to the second command in step S1417. Moreover, in step S1418, the first master controller 110 provides a notification about the preparation command, corresponding to the second command, for performing image formation preparation in the first image forming section 10. Steps 1417 and S1418 respectively correspond to steps S1215 and S1217 described above with reference to FIGS. 12A and 12B.

Subsequently, the first master controller 110 determines in step S1419 whether or not a completion notification corresponding to the first command is received from the second master controller 210. If a completion notification is not received (NO in step S1419), the first master controller 110 waits until it receives the completion notification. In contrast, if a completion notification is received (YES in step S1419 (i.e., this step corresponds to step S1226 described above with reference to FIGS. 12A and 12B)), the first master controller 110 notifies the first slave controller 120 of the image formation settings corresponding to the first command in step S1420. Moreover, the first master controller 110 notifies the first slave controller 120 of the preparation command, corresponding to the first command, for performing image formation preparation in the first image forming section 10 in step S1421. Steps S1420 and S1421 respectively correspond to steps S1227 and S1229 described above with reference to FIGS. 13A and 13B.

Subsequently, the first master controller 110 determines in step S1422 whether or not a completion notification indicating that the image forming process corresponding to the second command is completed is acquired from the first slave controller 120. Then, when the completion notification is acquired (YES in step S1422 (i.e., this step corresponds to step S1237 described above with reference to FIGS. 13A and 13B)), the first master controller 110 transmits, to the second master controller 210 in step S1423, the completion notification indicating that the image forming process corresponding to the second command is completed. Step S1423 corresponds to step S1238 described above with reference to FIGS. 13A and 13B.

Subsequently, the first master controller 110 determines in step S1424 whether or not information indicating the reception of the completion notification corresponding to the second command is received from the second master controller 210. If information indicating the reception of the completion notification is not received (NO in step S1424), the first master controller 110 waits until it receives the information. In contrast, if information indicating the reception of the completion notification is received (YES in step S1424 (i.e., this step corresponds to step S1241 described above with reference to FIGS. 13A and 13B)), the first master controller 110 transmits the information indicating the reception to the first slave controller 120 in step S1425. Step S1425 corresponds to step S1242 described above with reference to FIGS. 13A and 13B.

Subsequently, the first master controller 110 determines in step S1426 whether or not a completion notification indicating that the image forming process corresponding to the first command is completed is acquired from the first slave controller 120. If information indicating the acquisition of the completion notification is not received (NO in step S1426), the first slave controller 120 waits until it receives the information. In contrast, if a completion notification is received (YES in step S1426 (i.e., this step corresponds to step S1249 described above with reference to FIGS. 13A and 13B)), the first master controller 110 transmits, to the second master controller 210 in step S1427, a completion notification indicating that the image forming process corresponding to the first command is completed. Step S1427 corresponds to step S1250 described above with reference to FIGS. 13A and 13B.

Subsequently, the first master controller 110 determines in step S1428 whether or not information indicating the reception of the completion notification corresponding to the first command is received from the second master controller 210. If information indicating the reception of the completion notification is not received (NO in step S1428), the first master controller 110 waits until it receives the information. In contrast, if information indicating the reception of the completion notification is received (YES in step S1428 (i.e., this step corresponds to step S1253 described above with reference to FIGS. 13A and 13B)), the first master controller 110 transmits the information indicating the reception to the first slave controller 120 in step S1429. Step S1429 corresponds to step S1254 described above with reference to FIGS. 13A and 13B. Then, the first master controller 110 ends the image forming operation in step S811.

A process performed by the second master controller 210 according to the second exemplary embodiment will be described below with reference to flowcharts.

Figure 17:
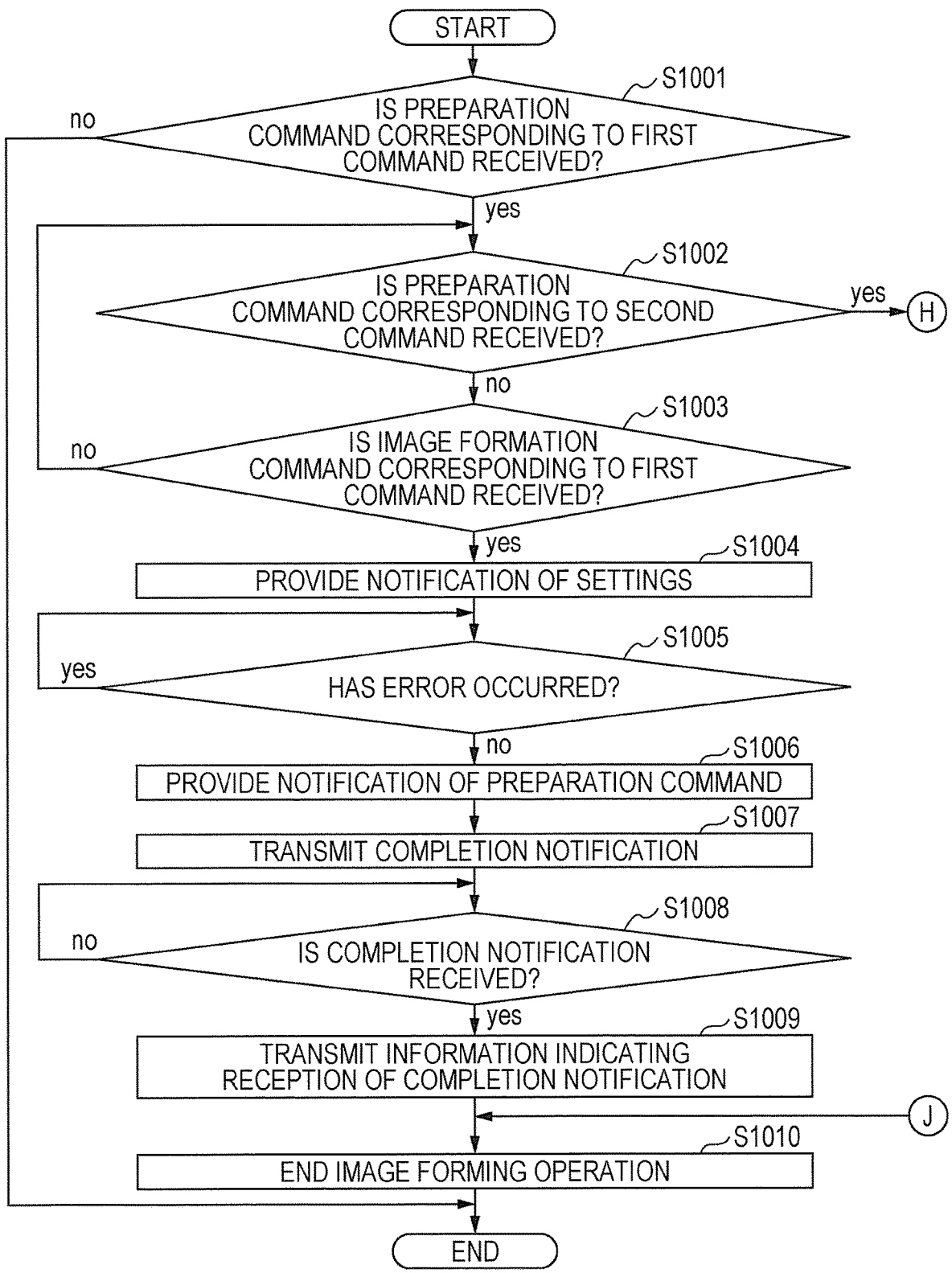
FIG. 17 is a flowchart illustrating an example of a process performed by the second master controller according to the second exemplary embodiment.
Figure 18:
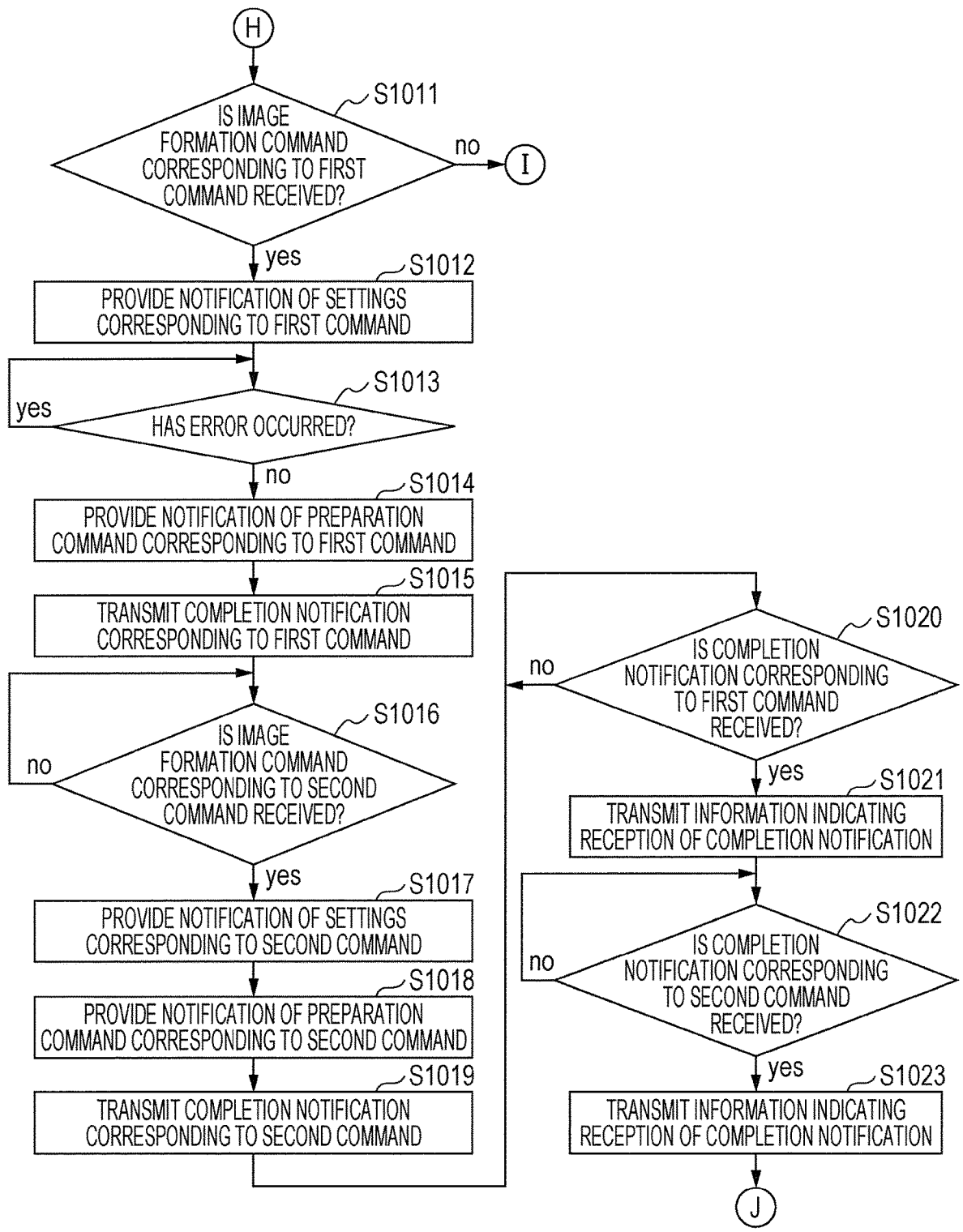
FIG. 18 is a flowchart illustrating the example of the process performed by the second master controller according to the second exemplary embodiment.
Figure 19:
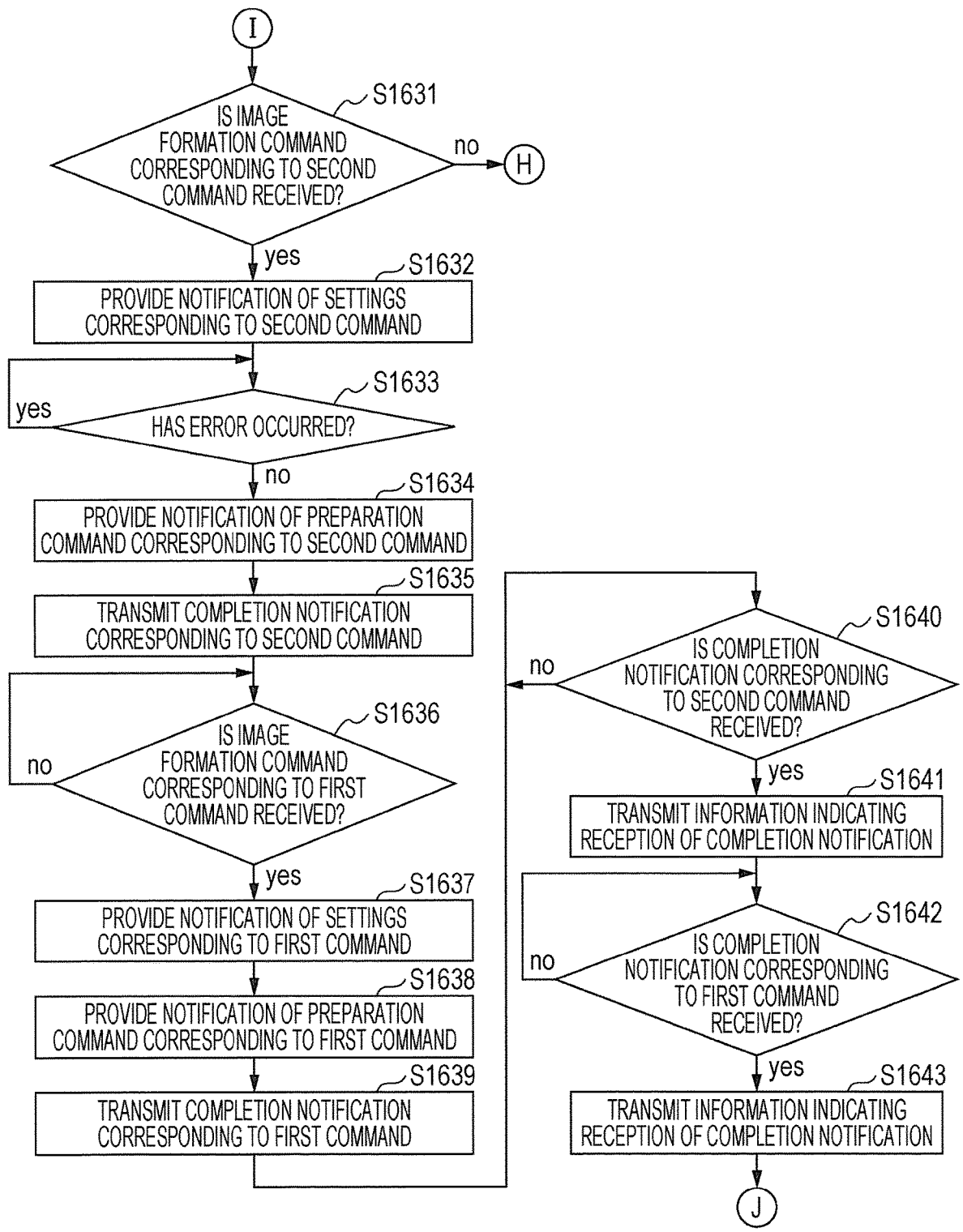
FIG. 19 is a flowchart illustrating the example of the process performed by the second master controller according to the second exemplary embodiment.

FIGS. 17, 18, and 19 are flowcharts illustrating an example of the process performed by the second master controller 210 according to the second exemplary embodiment. The second master controller 210 repeatedly performs this process at every predetermined fixed time period (e.g., 1 millisecond). In FIGS. 17, 18, and 19, steps identical to the steps shown in FIGS. 10 and 11 are given the same reference signs, and descriptions thereof will be omitted.

If the second master controller 210 has not received an image formation command corresponding to the first command (NO in step S1011), the second master controller 210 determines in step S1631 whether or not an image formation command corresponding to the second command is received. If an image formation command corresponding to the second command is not received (NO in step S1631), the second master controller 210 performs the process from step S1011 and onward. In contrast, if an image formation command corresponding to the second command is received (YES in step S1631 (i.e., this step corresponds to step S600 described above with reference to FIGS. 12A and 12B)), the second master controller 210 notifies the second slave controller 220 of the image formation settings corresponding to the second command in step S1632. Step S1632 corresponds to step S1208 described above with reference to FIGS. 12A and 12B.

Subsequently, the second master controller 210 determines in step S1633 whether or not an error has occurred in the second image forming section 20. If an error has occurred (YES in step S1633), the second master controller 210 waits until the error is resolved. In contrast, if an error has not occurred (NO in step S1633), the second master controller 210 notifies the second slave controller 220 of the preparation command, corresponding to the second command, for performing image formation preparation in the second image forming section 20 in step S1634. Step S1634 corresponds to step S1210 described above with reference to FIGS. 12A and 12B. Then, the second master controller 210 transmits a completion notification corresponding to the second command to the first master controller 110 in step S1635. Step S1635 corresponds to step S1213 described above with reference to FIGS. 12A and 12B.

Subsequently, the second master controller 210 determines in step S1636 whether or not an image formation command corresponding to the first command is received from an external source, such as the terminal apparatus 8. If an image formation command corresponding to the first command is not received (NO in step S1636), the second master controller 210 waits until it receives the image formation command corresponding to the first command. In contrast, if an image formation command corresponding to the first command is received (YES in step S1636), the second master controller 210 notifies the second slave controller 220 of the image formation settings corresponding to the first command in step S1637. Step S1637 corresponds to step S1220 described above with reference to FIGS. 12A and 12B. Then, in step S1638, the second master controller 210 notifies the second slave controller 220 of the preparation command, corresponding to the first command, for performing image formation preparation in the second image forming section 20. Step S1638 corresponds to step S1222 described above with reference to FIGS. 12A and 12B. Then, the second master controller 210 transmits a completion notification corresponding to the first command to the first master controller 110 in step S1639. Step S1639 corresponds to step S1225 described above with reference to FIGS. 12A and 12B.

Subsequently, the second master controller 210 determines in step S1640 whether or not a completion notification indicating that the image forming process corresponding to the second command is completed is received from the first master controller 110. If a completion notification is not received (NO in step S1640), the second master controller 210 waits until receives the completion notification. In contrast, if a completion notification is received (YES in step S1640 (i.e., this step corresponds to step S1239 described above with reference to FIGS. 13A and 13B)), the second master controller 210 transmits information indicating the reception of the completion notification to the first master controller 110 in step S1641. Step S1641 corresponds to step S1240 described above with reference to FIGS. 13A and 13B.

Subsequently, the second master controller 210 determines in step S1642 whether or not a completion notification indicating that the image forming process corresponding to the first command is completed is received from the first master controller 110. If a completion notification is not received (NO in step S1642), the second master controller 210 waits until receives the completion notification. In contrast, if a completion notification is received (YES in step S1642 (i.e., this step corresponds to step S1251 described above with reference to FIGS. 13A and 13B)), the second master controller 210 transmits information indicating the reception of the completion notification to the first master controller 110 in step S1643. Step S1643 corresponds to step S1252 described above with reference to FIGS. 13A and 13B. Then, the second master controller 210 ends the image forming operation in step S1010.

As described above, in the image forming apparatus 2 according to the second exemplary embodiment, the CPU 211 and the CPU 221 as an example of a second processor perform image formation preparation in the second image forming section 20 and transmit multiple completion notifications respectively corresponding to multiple preparation commands (steps S1213 and S1225) in the order in which multiple image formation commands respectively corresponding to the multiple preparation commands are received from an external source (steps S600 and S607), regardless of the order in which the preparation commands are received from the CPU 111 and the CPU 121 as an example of a first processor (steps S605 and S606).

Accordingly, the second processor may perform image formation preparation in the second image forming section 20 earlier than in a case where the second processor waits until it receives an image formation command corresponding to a preparation command received first from the first processor.

In the second exemplary embodiment described above, when the second master controller 210 receives preparation commands corresponding to the first command and the second command from the first master controller 110 (steps S605 and S606), if the second master controller 210 has not received an image formation command corresponding to the first command but has received an image formation command corresponding to the second command and if the second master controller 210 is executing an image forming process corresponding to an image formation command received prior to receiving the image formation command corresponding to the second command, the second master controller 210 may operate as follows.

Specifically, when an image forming process currently in progress is completed, if the second master controller 210 has received an image formation command corresponding to the first command after receiving an image formation command corresponding to the second command, the second master controller 210 may perform image formation preparation in the second image forming section 20 and transmit two completion notifications respectively corresponding to two preparation commands in the order in which the preparation commands are received from the first master controller 110.

Accordingly, image forming processes are executed in the same order as the order in which multiple image formation commands are received by the first processor, so that highly-reliable image forming processes corresponding to the same image formation command may be executed on a single sheet by the first image forming section 10 and the second image forming section 20.

Specifically, when the second master controller 210 receives a first one of multiple image formation commands, if the second image forming section 20 is performing an image forming process corresponding to an image formation command preceding the first image formation command, the second master controller 210 postpones the image formation preparation corresponding to the first image formation command until the relevant image forming process is completed. When the relevant image forming process is completed, if the second master controller 210 receives a second one of the multiple image formation commands, the second master controller 210 may perform image formation preparation and transmit completion notifications in the order in which preparation commands corresponding to the first image formation command and the second image formation command are received from the first master controller 110.

Accordingly, the first master controller 110 may be capable of executing image forming processes in the order in which image formation commands are received from an external source.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
   a first processor configured to control a transporter that transports a sheet and a first image forming section that forms an image on the sheet transported by the transporter; and
   a second processor configured to control a second image forming section that forms an image on the sheet transported by the transporter,
   wherein, when the first processor and the second processor receive a single image formation command from an external source, the first processor is configured to transmit a preparation command for performing image formation preparation in the second image forming section to the second processor, the second processor, when receiving the preparation command, is configured to perform the image formation preparation in the second image forming section and transmit a completion notification to the first processor upon completion of the image formation preparation, and the first processor, after receiving the completion notification, is configured to subsequently execute an image forming process including causing the transporter to transport the sheet and causing the first image forming section to form the image, and
   wherein, if the first processor receives a plurality of image formation commands from the external source before transmitting the preparation command to the second processor, the first processor is configured to transmit a plurality of preparation commands corresponding to the plurality of image formation commands to the second processor and execute the image forming process in a sequence in which a plurality of completion notifications corresponding to the plurality of preparation commands are received from the second processor.

2. The image forming apparatus according to claim 1, wherein, if the second processor receives the plurality of preparation commands before transmitting the completion notification, the second processor is configured to perform the image formation preparation in the second image forming section and transmit the plurality of completion notifications corresponding to the plurality of preparation commands in a sequence in which the plurality of preparation commands are received, regardless of a sequence in which the plurality of image formation commands corresponding to the plurality of preparation commands are received from the external source.

3. The image forming apparatus according to claim 1, wherein, when the second processor receives the plurality of preparation commands, even if the second processor has received the image formation command that does not correspond to the preparation command received first among the plurality of preparation commands, the second processor is configured to wait until the second processor receives the image formation command corresponding to the first-received preparation command.

4. The image forming apparatus according to claim 2, wherein, when the second processor receives the plurality of preparation commands, even if the second processor has received the image formation command that does not correspond to the preparation command received first among the plurality of preparation commands, the second processor is configured to wait until the second processor receives the image formation command corresponding to the first-received preparation command.

5. The image forming apparatus according to claim 1, wherein the second processor is configured to perform the image formation preparation in the second image forming section and transmit the plurality of completion notifications corresponding to the plurality of preparation commands in a sequence in which the plurality of image formation commands corresponding to the plurality of preparation commands are received from the external source, regardless of a sequence in which the plurality of preparation commands are received from the first processor.

6. The image forming apparatus according to claim 5, wherein, when the second processor receives a first one of the plurality of image formation commands, if an image forming process corresponding to an image formation command preceding the first image formation command is being performed at the second image forming section, the second processor is configured to postpone the image formation preparation until the image forming process is completed, and wherein, if a second one of the plurality of image formation commands is received when the image forming process is completed, the second processor is configured to perform the image formation preparation and transmit the completion notifications in a sequence in which the preparation commands corresponding to the first image formation command and the second image formation command are received.

7. A non-transitory computer readable medium storing a program causing a first processor and a second processor to execute a process, the first processor being configured to control a transporter that transports a sheet and a first image forming section that forms an image on the sheet transported by the transporter, the second processor being configured to control a second image forming section that forms an image on the sheet transported by the transporter, the process comprising:
   causing the first processor to transmit a preparation command for performing image formation preparation in the second image forming section to the second processor when the first processor and the second processor receive a single image formation command from an external source;
   causing the second processor, when receiving the preparation command, to perform the image formation preparation in the second image forming section and to transmit a completion notification to the first processor upon completion of the image formation preparation;

causing the first processor, after receiving the completion notification, to execute an image forming process including causing the transporter to transport the sheet and causing the first image forming section to form the image; and causing the first processor, if the first processor receives a plurality of image formation commands from the external source before transmitting the preparation command to the second processor, to transmit a plurality of preparation commands corresponding to the plurality of image formation commands to the second processor and execute the image forming process in a sequence in which a plurality of completion notifications corresponding to the plurality of preparation commands are received from the second processor.

8. An image forming apparatus comprising:

first processing means for controlling a transporter that transports a sheet and a first image forming section that forms an image on the sheet transported by the transporter; and second processing means for controlling a second image forming section that forms an image on the sheet transported by the transporter, wherein, when the first processing means and the second processing means receive a single image formation command from an external source, the first processing means transmits a preparation command for performing image formation preparation in the second image forming section to the second processing means, the second processing means, when receiving the preparation command, performs the image formation preparation in the second image forming section and transmits a completion notification to the first processing means upon completion of the image formation preparation, and the first processing means, after receiving the completion notification, subsequently executes an image forming process including causing the transporter to transport the sheet and causing the first image forming section to form the image, and wherein, if the first processing means receives a plurality of image formation commands from the external source before transmitting the preparation command to the second processing means, the first processing means transmits a plurality of preparation commands corresponding to the plurality of image formation commands to the second processing means and executes the image forming process in a sequence in which a plurality of completion notifications corresponding to the plurality of preparation commands are received from the second processing means.

* * * * *